Feb. 21, 1967
W. M. BARKER
3,305,837
CODED SUPERVISORY CONTROL SYSTEM
Filed Dec. 3, 1962
15 Sheets-Sheet 1
FIG. IA
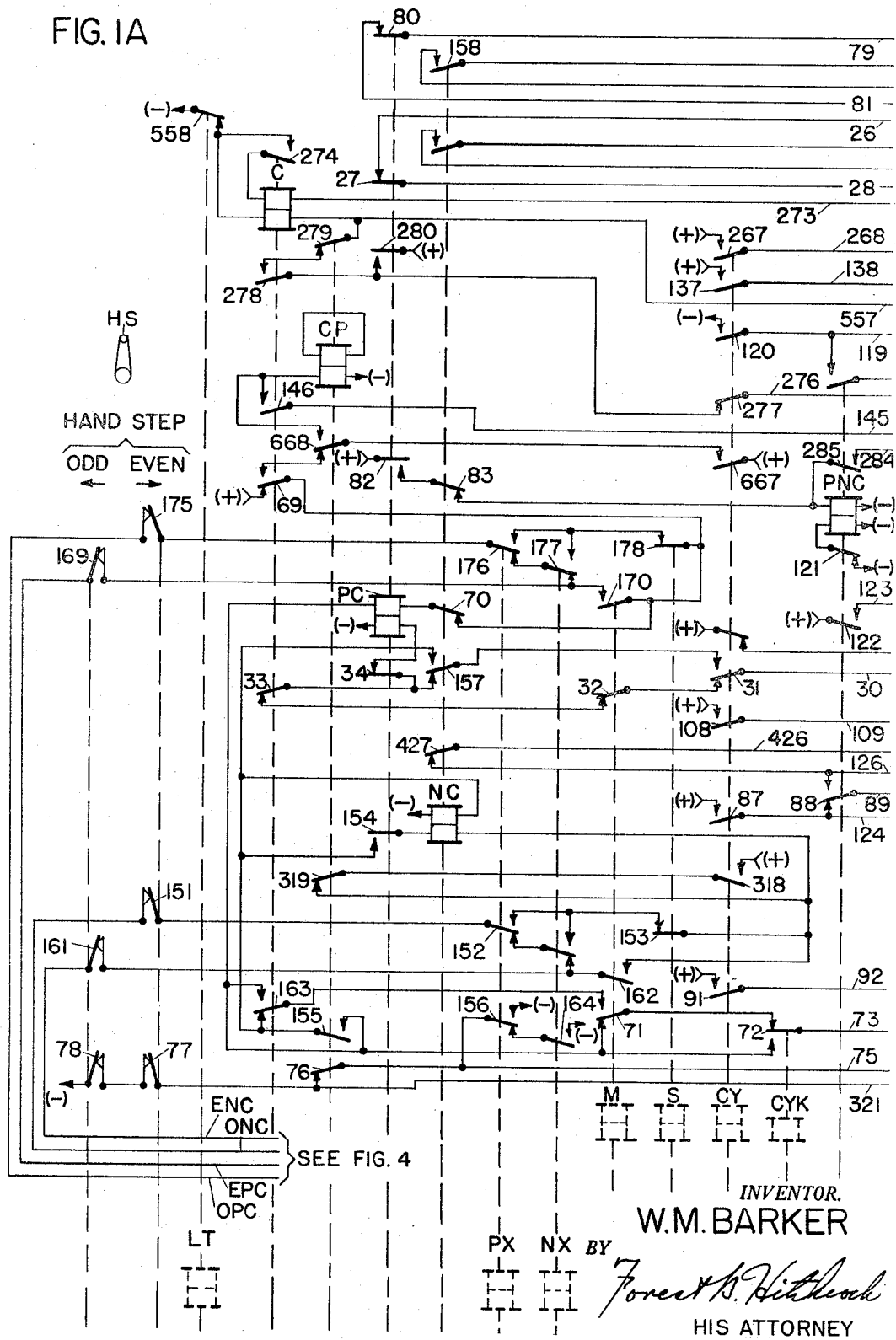
INVENTOR.
W.M. BARKER
BY Forest B. Hitchcock
HIS ATTORNEY

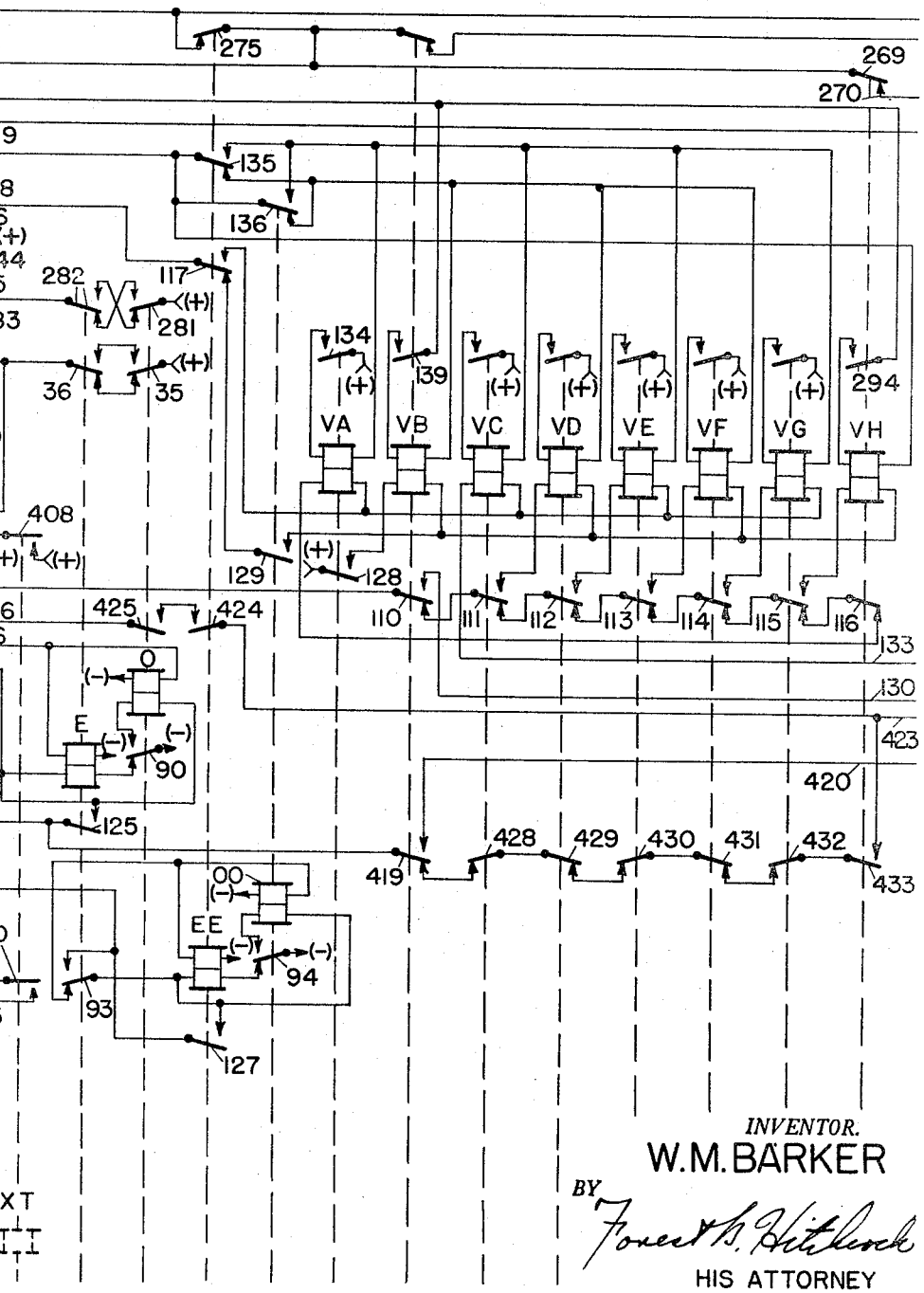

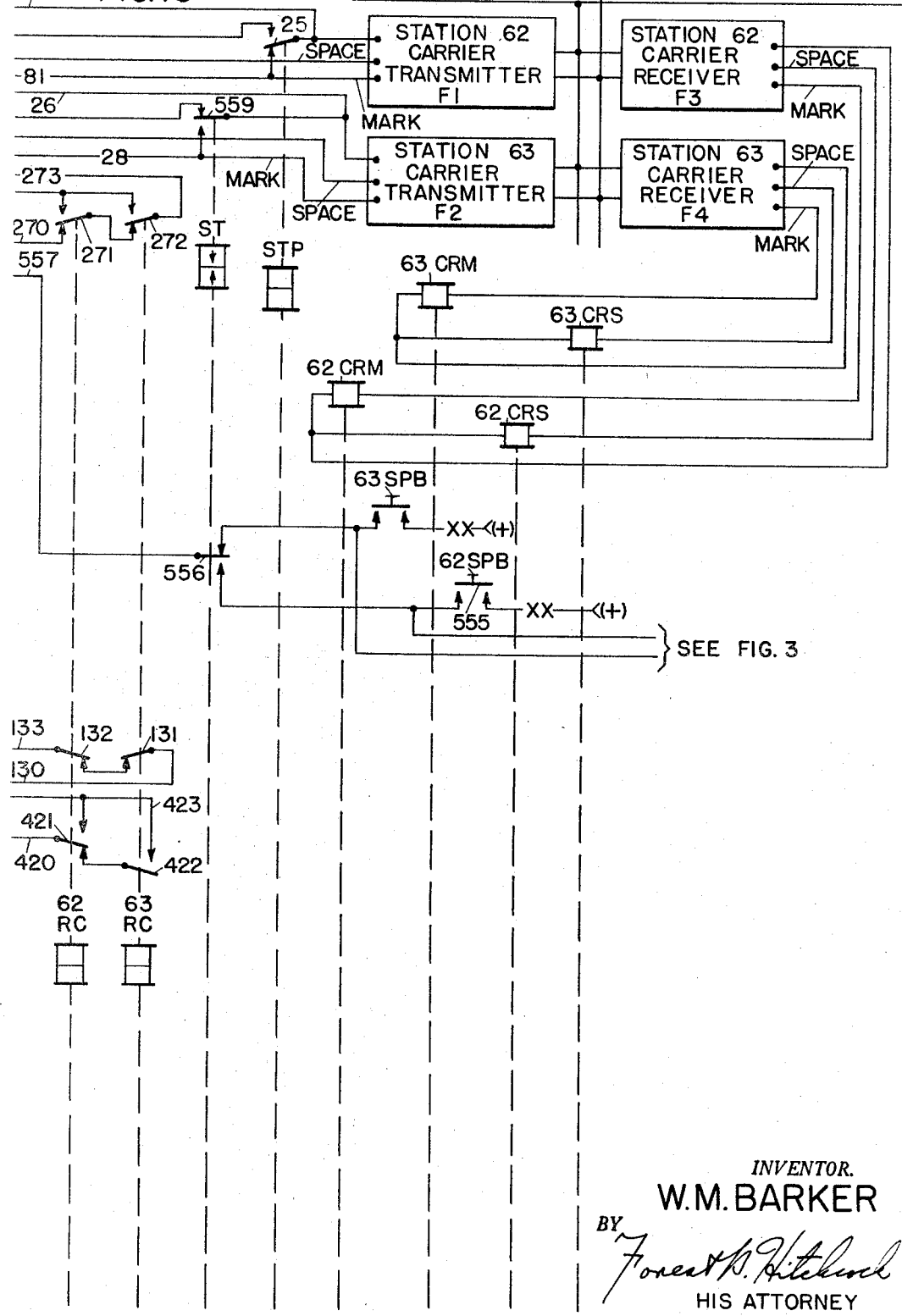

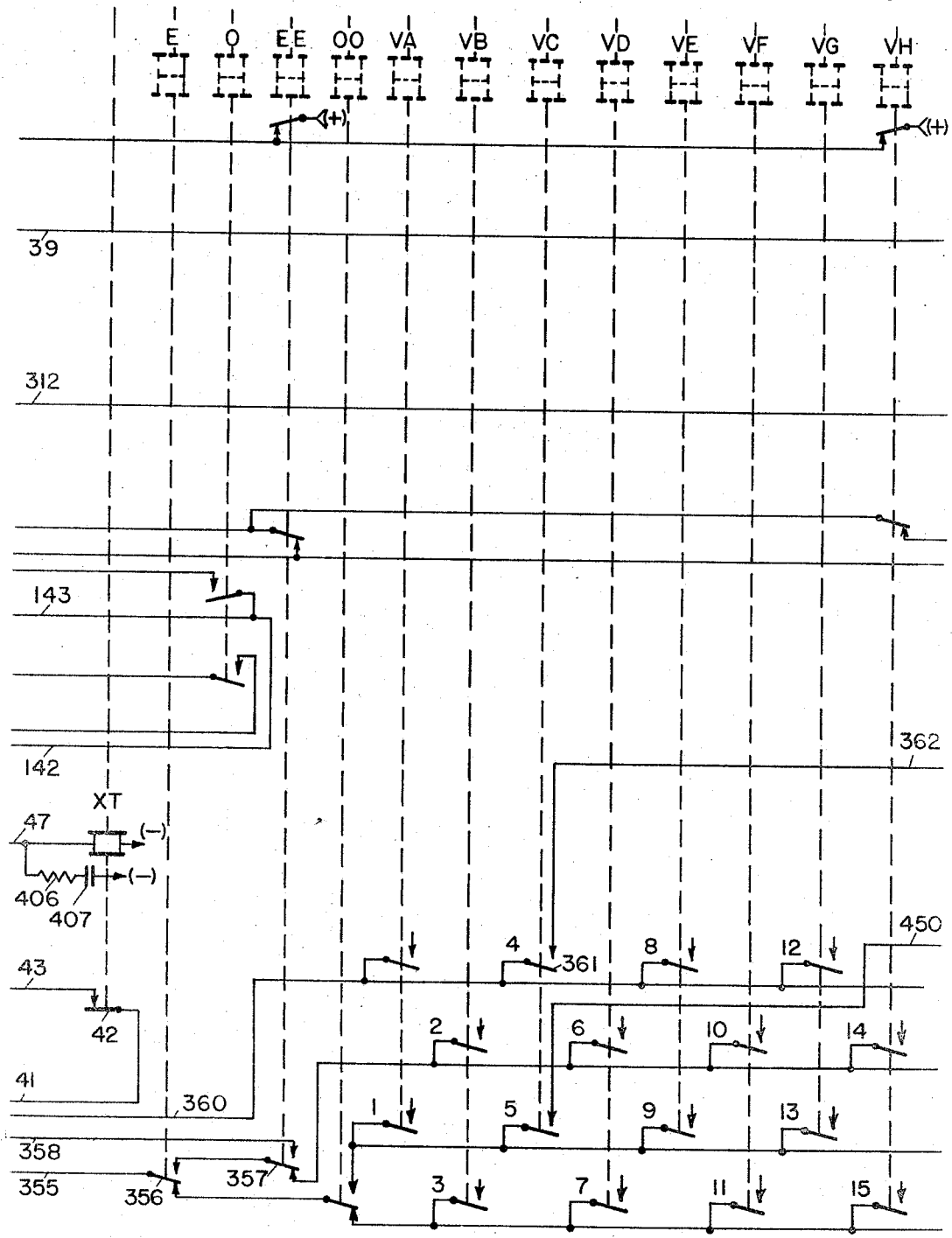
FIG. IE

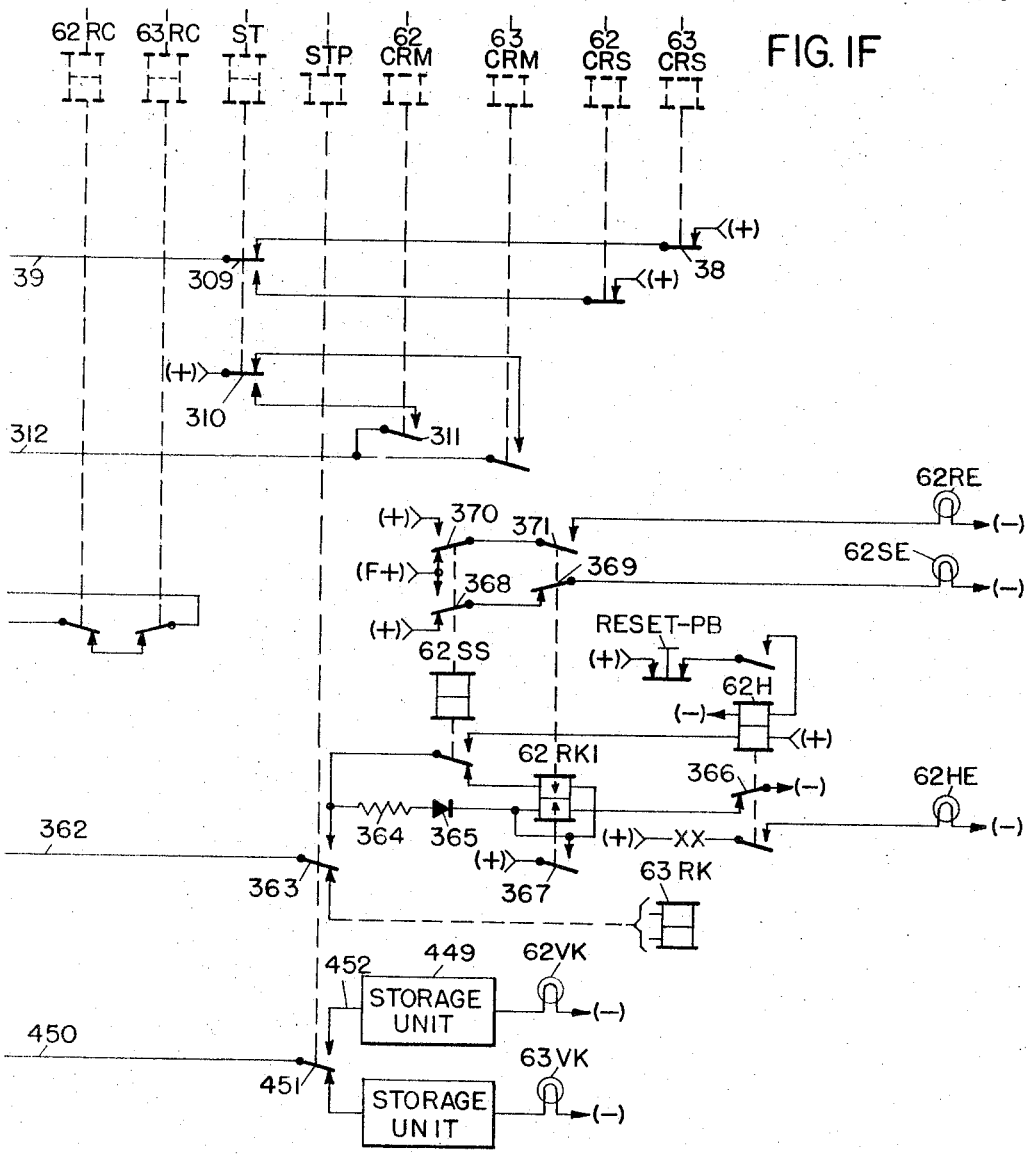

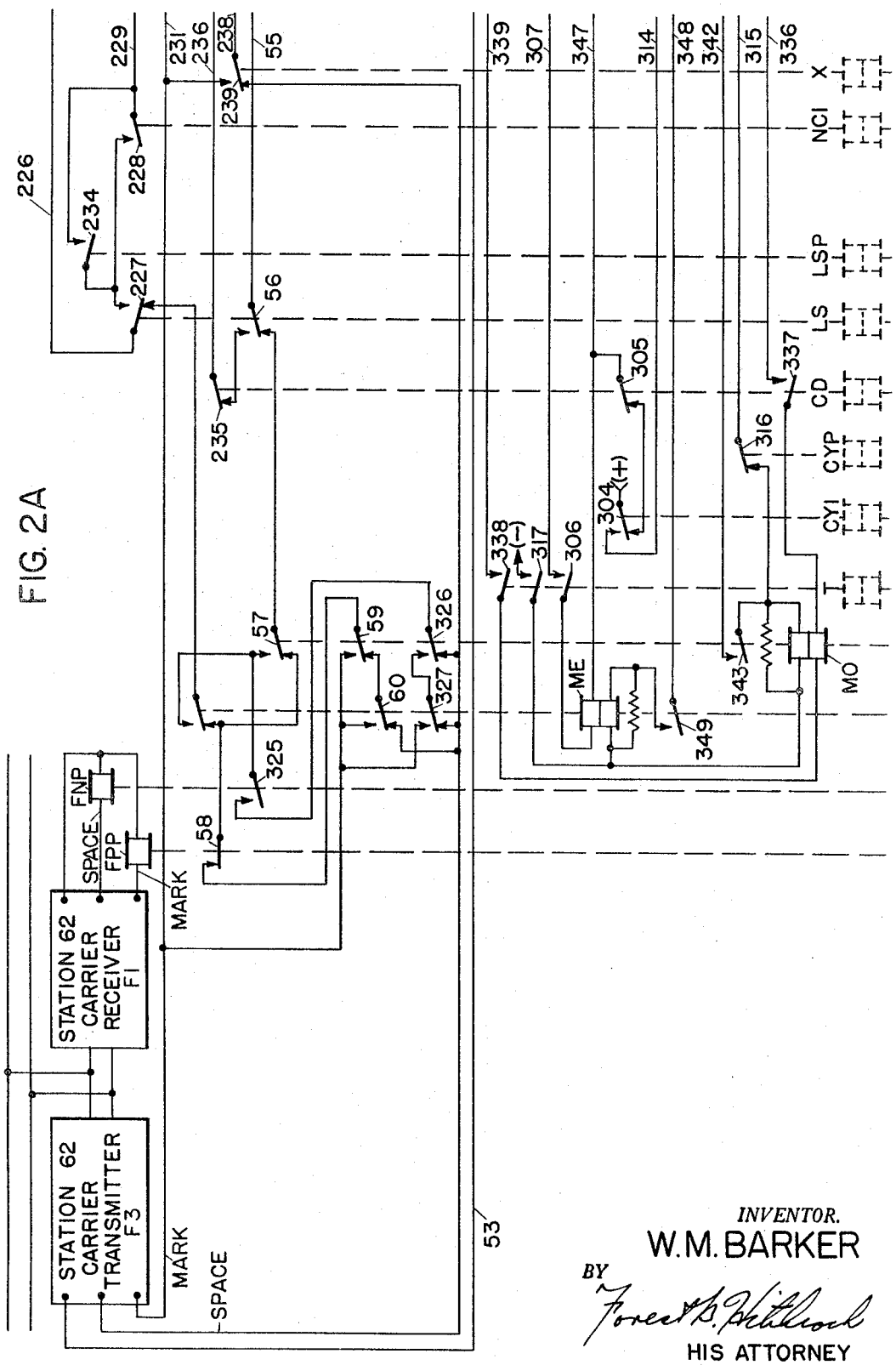

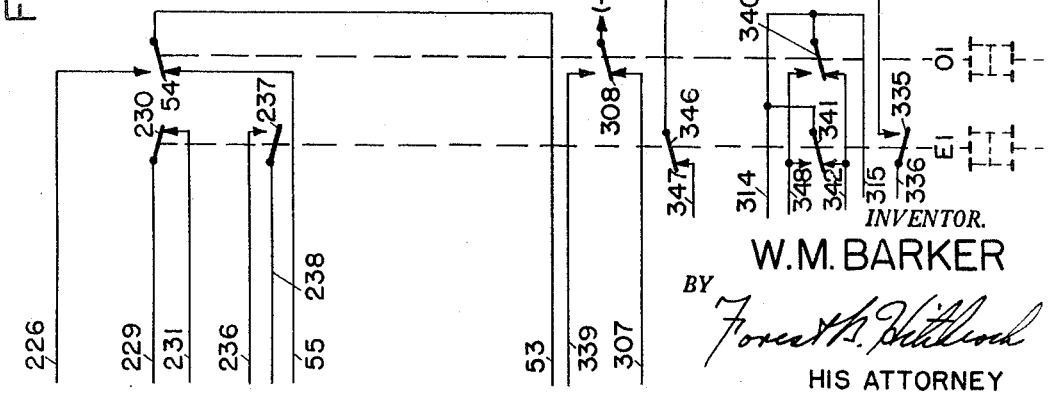

INVENTOR:
W.M. BARKER
HIS ATTORNEY

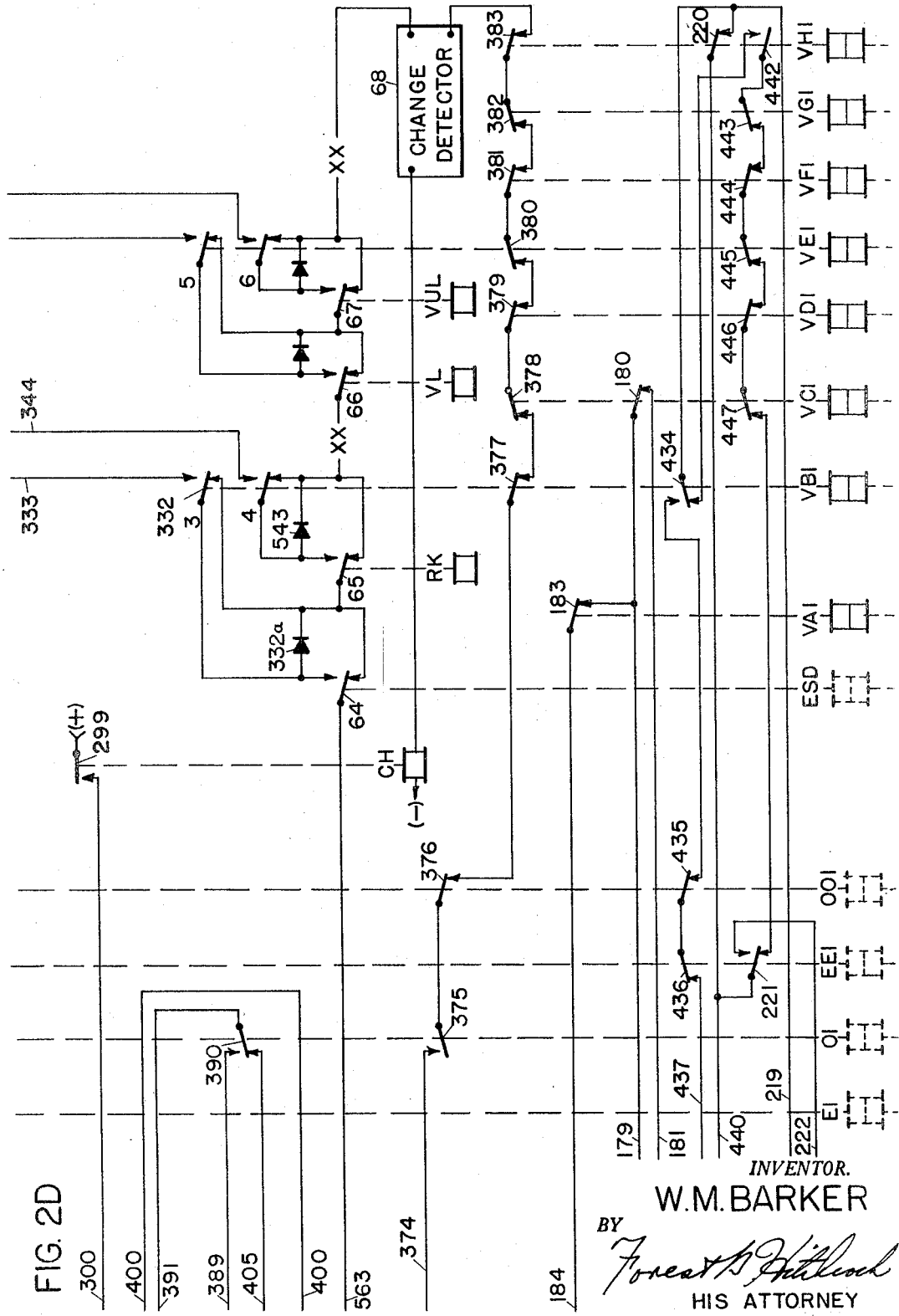

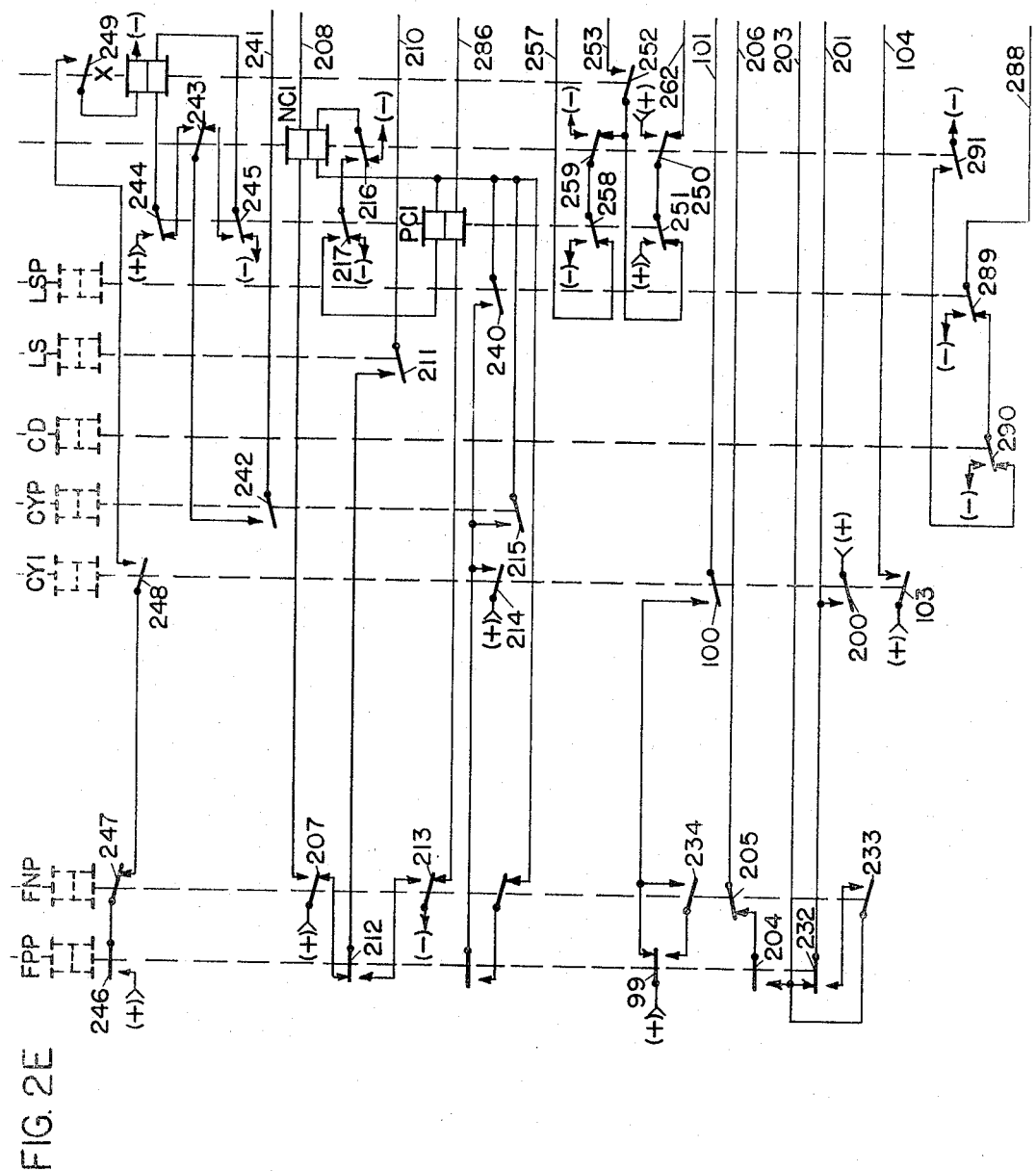

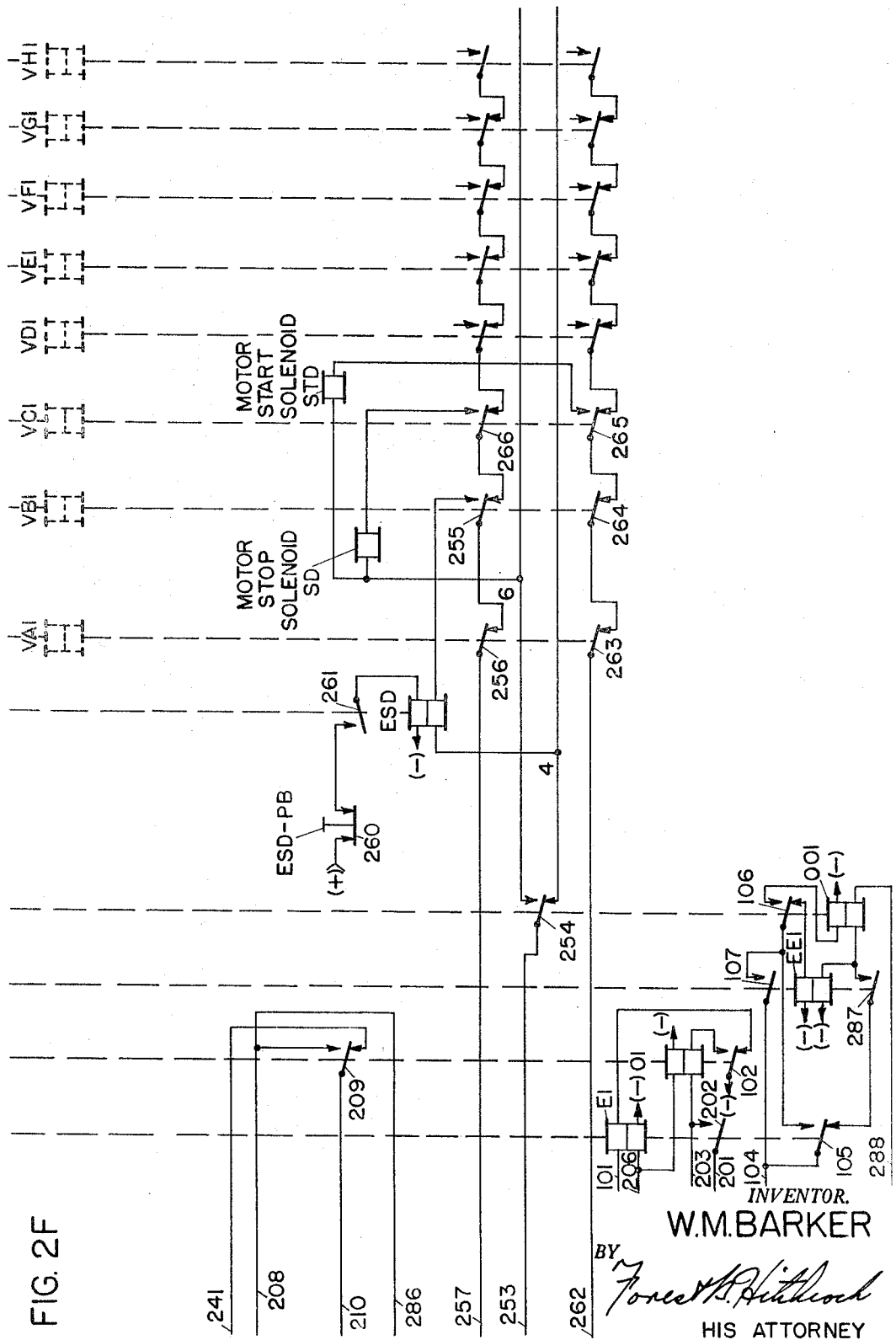

Feb. 21, 1967 W. M. BARKER 3,305,837
CODED SUPERVISORY CONTROL SYSTEM
Filed Dec. 3, 1962 15 Sheets-Sheet 13

INVENTOR.
W.M.BARKER
BY
Forest H. Hitchcock
HIS ATTORNEY

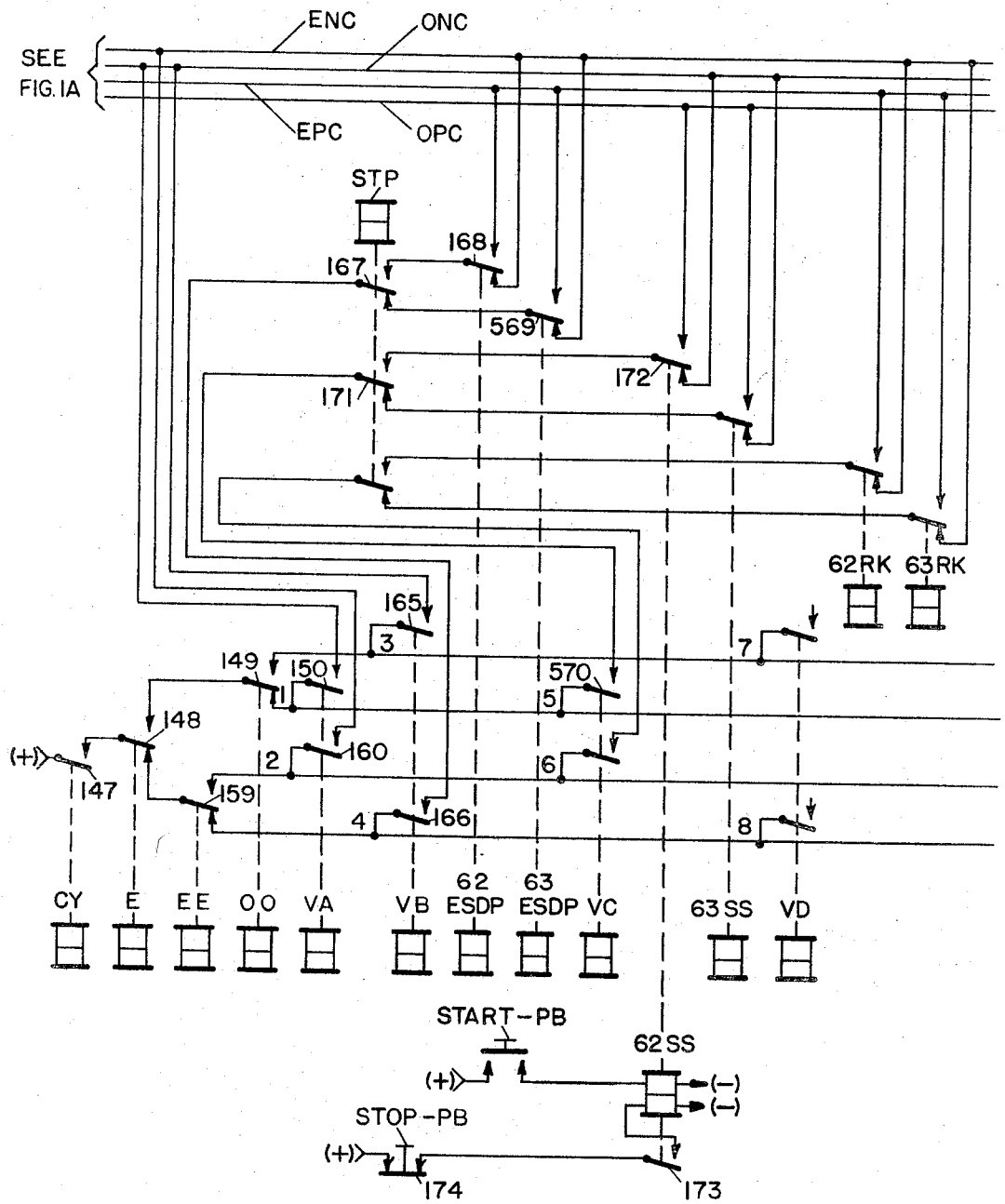

Feb. 21, 1967  W. M. BARKER  3,305,837
CODED SUPERVISORY CONTROL SYSTEM
Filed Dec. 3, 1962  15 Sheets-Sheet 15

INVENTOR.
W. M. BARKER
BY
HIS ATTORNEY

United States Patent Office 3,305,837
Patented Feb. 21, 1967

3,305,837
CODED SUPERVISORY CONTROL SYSTEM
William M. Barker, Scottsville, N.Y., assignor to General Signal Corporation
Filed Dec. 3, 1962, Ser. No. 242,006
15 Claims. (Cl. 340—163)

This invention relates to coded supervisory control systems and it more particularly pertains to normally at rest code communication systems, for the control from a control office of devices at remote stations and for the communication of indications of the conditions of the devices to the control office.

A supervisory control system of the character provided by the present invention may be used, for example, for the communication of control and indication codes between an office and remote pumping stations in an oil or gas pipeline system. Under these conditions there are pumps to be remotely started and stopped, and there are conditions of equipment at the remote stations to be indicated at the control office.

In the supervisory control system provided according to the present invention, it is contemplated that the code characters will be transmitted over a full duplex frequency shift carrier channel extending between a control office and the field stations. Integrity of both the communication of control codes and the communication of indication codes is guaranteed by the progresive exchange of information between transmitting and receiving stations during each code cycle. Errors which might occur during an indication cycle are self correcting. Control cycles are checked to prevent false controls and a warning is given to the operator whenever a control is not executed.

Control and indication codes are communicated during cycles of operation of the communication apparatus wherein the control office determines the rate of stepping, and the stepping at each of the field stations is effectively driven by the control office. Control and indication codes are selectively transmitted by a series of binary frequency shift pulses during "on" intervals, or digits each separated from the next by a center frequency or "off" period. One code character is transmitted during each of the "on" periods.

During the transmission of a control code from the control office, the field sends back a series of binary pulses, alternating in character, one during each digit. The office continues to transmit, digit by digit, only as long as it receives the proper character from the field. Thus, the office is assured that the field is receiving its driving pulses and is in synchronism. The driving pulses are grouped in pairs, one pair assigned to each device at a field station to be controlled. The character transmitted during the first (odd numbered) of the two digits determines by its character what is to be done to the function. The second digit (even numbered), if opposite in character, will deliver the control in the following "off" interval to the function for a predetermined duration.

Should the even digit of two control digits be the same in character, no control will be delivered, and the system will immediately advance to the next odd digit without pausing. If the even digit is a delivery digit, a field execution relay is actuated, which changes the character of the inbound checking pulse. At the same time, an office execution detector is released which permits continuation of the cycle only so long as the incoming digit is changed in character.

It is therefore provided that transmisison by either the control office or a field station is checked as to the integrity of communication and an alarm is actuated at the control office if there is lack of synchronization between the control office and the field, if there is improper actuation of the field execution relay, if there is improper or lack of answer back code, and if there is any condition resulting in disagreement between an execution detector and an execution relay.

The code elements communicated for both control codes and indication codes will be referred to as mark and space elements, which are actually communicated over the line circuit in one embodiment of the present invention as distinctive carrier shift frequencies.

An object of the present invention is to employ a frequency divider in a code communication system for the selection of four sequential time spaced code digits for every two steps that are counted during a cycle of operation of the communication system.

Another object of the present invention is to transmit selected control pulses during alternate digits and to designate as to whether a control code is to be executed by the character of the code transmitted during the next following digit.

Another object of the present invention is to employ solid state indication storage means at the control office for maintaining energization of an indicator device in response to momentary control during a particular indication channel of an indication cycle.

Another object of the present invention is to employ a solid state change detector at each field station for initiating an indication cycle in response to a change in the position of a device at that field station.

Another object of the present invention is to provide a prolonged off period during a cycle to permit extra time for control code execution at the field station, subject to a check of the integrity of the code communication system.

Another object of the present invention is to provide an integrity checking means for checking the communication of indication codes during an indication cycle wherein a cycle is permitted to progress from step to step only so long as a character is received from the office during each digit that is opposite in character to the code transmitted from the field station during the next preceding digit.

Another object of the present invention is to automatically initiate a new indication cycle at a field station in case of detection at the transmitting station of erroneous operation during an indication cycle.

Another object of the present invention is to provide an indication at the office if there is lack of synchronism between office and field station transmission.

Another object of the present invention is to provide an indication at the office if improper actuation of field execution control apparatus is detected.

Another object of the present invention is to provide an indication at the office if there is improper or lack of answer back code received from the field station.

Other objects, purposes and charatcertistic features of the present invention will be in part obvious from the accompanying drawings, and in part pointed out as the description of the invention progresses.

In describing the invention in detail, reference will be made to the accompanying drawings in which those parts having similar features and functions are designated through the several illustrations by like letter reference characters which may be made distinctive by numerals associated therewith, and in which:

FIGS. 1A through 1F when considered together according to the arrangement plan of FIG. 7 illustrates the transmitting and receiving apparatus for one embodiment of the present invention that is employed at a control office;

FIGS. 2A through 2F when arranged according to FIG. 8 illustrate the apparatus for one embodiment of the present invention that is provided at a typical field location or station;

FIG. 4 illustrates a typical means for determining the control codes to be transmitted from the control office to the field stations;

FIG. 7 is an arrangement plan illustrating the arrangement of the drawings of FIGS. 1A through 1F;

FIG. 8 is an arrangement plan of the drawings of FIGS. 2A through 2F; and

Figure 1D:
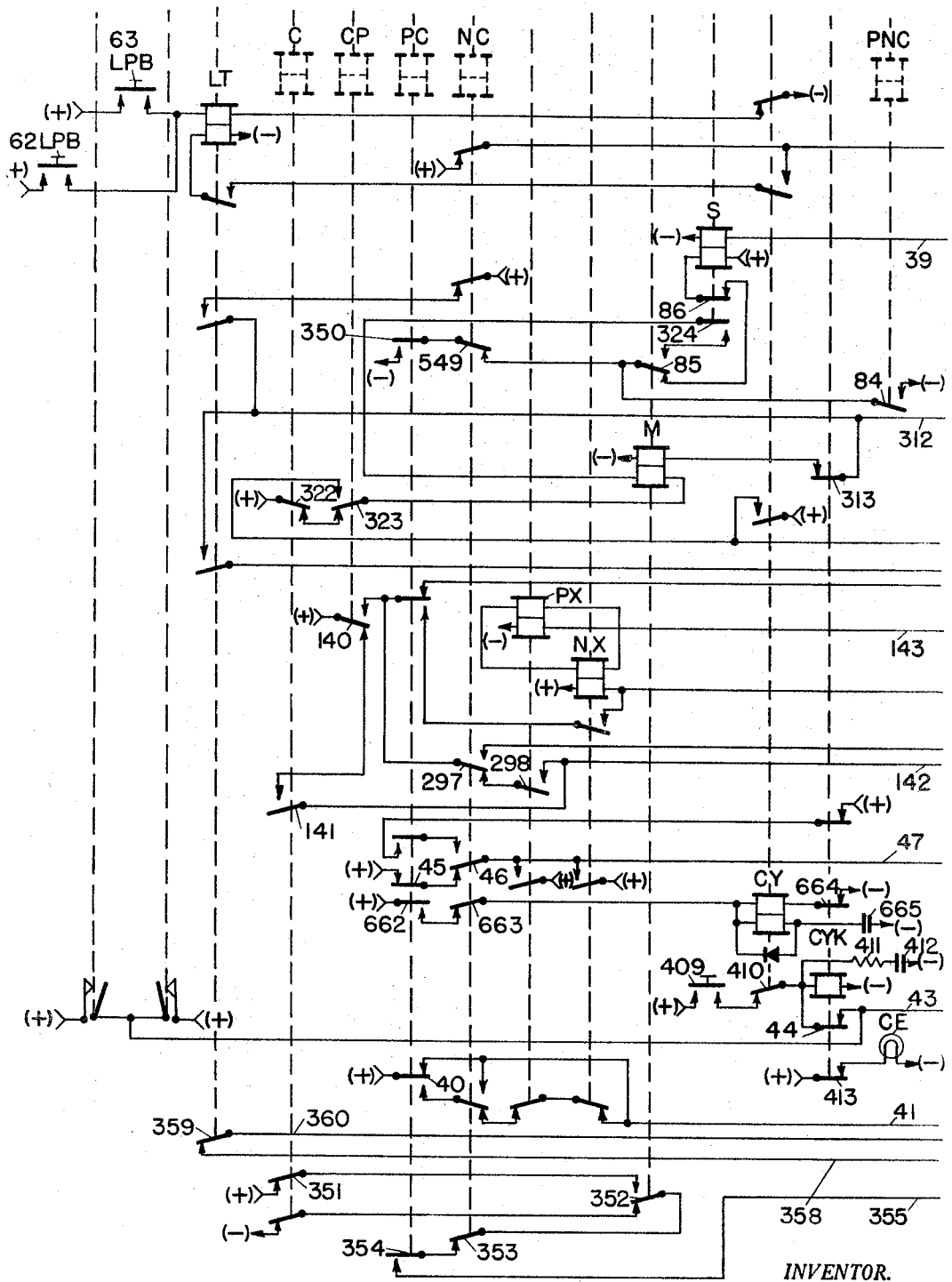

The illustrations employed in the disclosure of this embodiment of the present invention have been arranged to facilitate the disclosure of the invention as to its mode of operation and the principles involved, rather than for the purpose of illustrating the construction and arrangement of parts that would be employed in practice. The symbols (+) and (−) are employed to designate the positive and negative terminals respectively of suitable batteries or other sources of direct current.

In order to simplify the description of the present invention, reference is made from time to time to functions common to all parts of a similar character by use in the description of letter reference characters common to such parts but having distinctive numerals or other distinctive identification. It is to be understood that such a reference applies to any parts designated in the drawings by reference characters having such letters. The reference characters 1 through 16 have been used to designate the respective digits during which certain controls are rendered effective.

Figure 9:
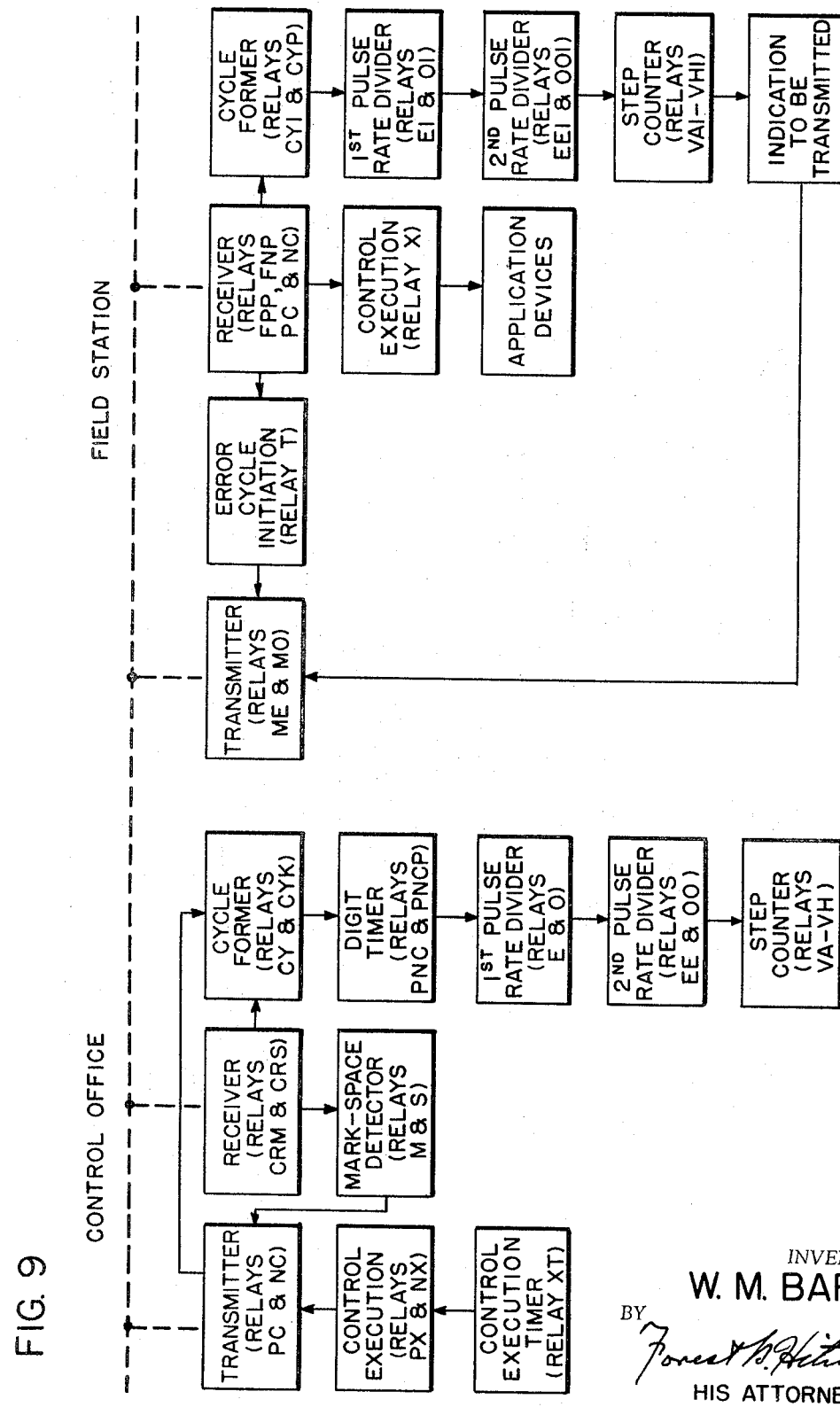
FIG. 9 is a block diagram showing the general organization of the system according to one embodiment of the present invention.

With reference to the block diagram of FIG. 9, the control apparatus at the control office comprises a code transmitter and a code receiver. A cycle former is controlled by both the transmitter and the receiver and it governs a digit timer. The digit timer controls a first pulse rate divider, which in turn controls a second pulse rate divider. A step counter is governed by the second pulse rate divider. Mark and space detector relays are controlled by the receiver, and they in turn govern the selection of characters for transmission under certain conditions. The transmitter at the control office is governed by control execution circuits, which in turn are governed by a control execution timer.

With reference to FIG. 9, the apparatus at a typical field station is illustrated wherein transmitter, receiver, cycle forming frequency dividers and stepper apparatus is provided comparable to similar apparatus at the control office. The receiver apparatus at the field station operates application devices through control execution circuits. The transmitter at the field station is governed both by indications to be transmitted and by error cycle initiating means for automatically initiating a new cycle of operation if an error is detected.

It is to be understood that the system includes a suitable control panel (not shown) at the control office having push buttons disposed thereon, or other suitable switching devices, for designation of controls to be communicated to the respective field stations. Also disposed on the control panel are indication devices such as indicator lamps illustrated in FIG. 1F, horns, and the like, for indicating the condition of apparatus at the respective field stations.

Figure 3:
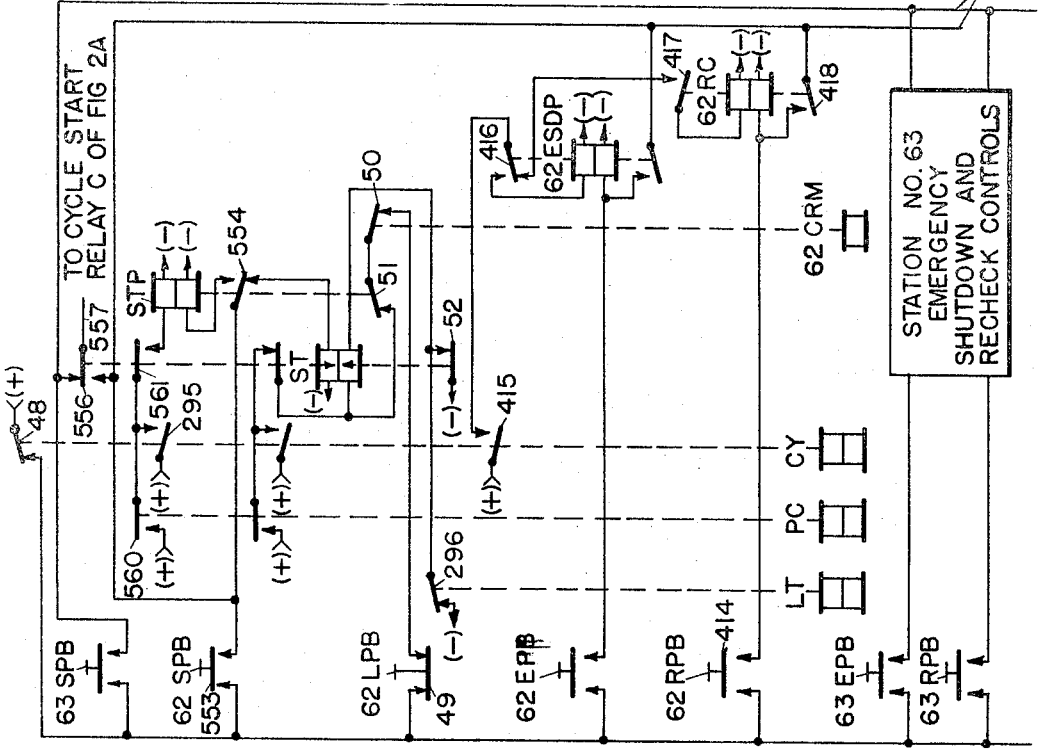
FIG. 3 illustrates typical application relays used at the control office and operable in response to manual designation of controls for communication to the field stations.

With reference to FIG. 3, push buttons are shown for designation of controls for transmission to the respective field stations numbers 62 and 63 wherein the push buttons 62SPB and 63SPB are start push buttons for transmission to field stations Nos. 62 and 63 respectively, a lamp test push button 62LPB is provided, and push buttons 62EPB and 63EPB are provided for the emergency shut-down control of stations Nos. 62 and 63 respectively. Push buttons 62RPB and 63RPB are provided for the manual designation of a recheck of the indications at the respective field stations Nos. 62 and 63. With reference to FIG. 4, a Start–PB is provided for designating the starting of a motor at station No. 62, and a Stop–PB is provided for designation of the stopping of such motor.

Typical indicator lamps that are provided on the control panel at the control office are shown in FIG. 1F, wherein the lamp 62RE is a run indicator lamp and lamp 62SE is a stop indicator lamp for indicating the condition of the motor at station No. 62. The indicator lamp 62HE is provided for indicating a condition of out of correspondence of the controls designated as compared to the condition of the apparatus at field station No. 62.

As an optional feature of the system, a hand step switch HS can be provided as is shown in FIG. 1A for the hand step operation of the system to assist in checking the operation of the system on the different steps.

A control relay C (see FIG. 1A) is provided at the control office, together with a repeater relay CP to initiate a control cycle of operation of the system and to perform various requirements for a control cycle.

Relays PC and NC (see FIG. 1A) are provided at the control office for controlling the keying of the office carrier transmitters in accordance with control codes that have been selected for transmission.

Relays PNC, PNCP, E, O, EE and OO (see FIGS. 1A and 1B) are provided at the control office for generating a cyclic action which once started drives the system through its several steps and times the duration of each code digit.

Relays PX and NX (see FIG. 1D) are execution detector relays which have the function of controlling a relay XT (see FIG. 1E) that is used to time a long period in the cycle used at the field stations for execution of control codes. The relays PX and NX are controlled in accordance with the code transmitted during a control cycle. The relays PX and NX in conjunction with relays M and S (see FIG. 1D) check the integrity of the communication system before permitting the execution of a control code.

Relays CY and CYK (see FIG. 1D) are slow acting relays which are used in checking the operation of the system during a cycle to provide automatic clearout under certain conditions.

Station 62 Carrier Receiver F3 (see FIG. 1C) and Station 63 Carrier Receiver F4 are provided at the control office for receiving the codes transmitted by the respective field stations Nos. 62 and 63. These receivers have receiving relays 62CRM and 63CRM associated therewith for receiving mark code characters and relays 62CRS and 63CRS for receiving space code characters. Mark and space relays M and S (see FIG. 1D) are provided for actuation in response to the carrier receiver relays corresponding to mark and space characters transmitted from the field stations.

A bank of counting relays VA through VH (see FIG. 1B) is provided at the control office for counting the respective steps of a cycle of operation. This bank of relays counts eight steps, and two code digits are provided for each of the eight steps by the selective operation of the relays E, O, EE and OO.

With reference to FIG. 3, station relays ST and STP are provided for selecting the particular station 62 or station 63 with which communication is to be maintained.

Relay 62ESDP (see FIG. 3) is an emergency shutdown relay, and a relay 62RC is used for initiating a recheck of the indications from field station No. 62.

With reference to FIG. 2A, the typical field station No. 62 has carrier transmitting and receiving apparatus comparable to what has been described as being provided at the control office, each field station having its own assigned carrier frequency both for transmission and for reception. Receiving relays FPP and FNP are provided at the field station for the reception of mark and space code characters respectively over the carrier frequency F1.

Each of the field stations has step and digit counting relays E1, O1, EE1, OO1 (see FIG. 2B), and VA1 through VH1 (see FIG. 2D) which are comparable to relays having similar letter reference characters that are used at the control office. A relay CY1 is provided at each field station for cycle marking purposes as has been described for a similar relay at the control office. Relay CY1 (see FIG. 2C) has a repeater relay CYP associated therewith.

Relays PC1 and NC1 are mark and space relays respectively which are used in conjunction with relays FPP and FNP for the reception of control codes.

A relay LS (see FIG. 2C) is provided at each field station as a location selection relay which, when picked up, permits the reception of controls. If a counter fails to operate properly, the relay LS will be released, preventing execution of a control that is being transmitted. The relay LS has a repeater relay LSP associated therewith which provides a means for automatically creating a field indication start any time an incomplete control cycle occurs, such as in a recheck cycle.

A relay X (see FIG. 2E) is provided at each field station for the purpose of rendering effective the execution of a control code by closing the circuit to energize the device being controlled.

Relays ME and MO (see FIG. 2A) are provided at each field station for keying and code checking purposes in an indication cycle.

A relay T (see FIG. 2C) is provided at each of the field stations for checking the integrity of transmission by that station. If an error occurs in either inbound or outbound transmissions, the relay T will be dropped away and a repeat cycle will be initiated.

A relay CD (see FIG. 2C) is provided at each of the field stations for cycle distribution purposes.

A normally energized change relay CH (see FIG. 2D) is provided for initiating the system into a cycle of operation at each field station when there is a change in the condition of a device at that field station to have its indication transmitted. This relay is controlled by a transistorized Change Detector 68 having its circuits shown in detail in FIG. 5.

Motor Start Solenoid STD and motor Stop Solenoid SD are illustrated in FIG. 2F as being controlled in accordance with control codes received from the control office. Similarly an emergency shutdown relay ESD is subject to control from the control office.

Having thus considered the organization of the system in general, consideration in detail of the circuits involved for the control of the respective relays will be hereinafter given when considering the mode of operation of the system under typical operating conditions.

*Operation*

Before considering specifically the circuit organization and mode of operation during typical conditions, it is believed expedient to consider the mode of operation in general without specific reference to the circuits involved in such operation.

Normally, when the code communication system is inactive, the control office is transmitting a mark steadily on carrier frequencies F1 and F2 respectively. This causes each of the field stations Nos. 62 and 63 to reply by transmitting steadily a space character on their respective carrier frequencies F3 and F4.

If a control start is initiated, as for the transmission to station No. 62 of a designated control code, the control office continues to transmit a mark steadily to station No. 63, as during a period of rest, but there is a break in the transmission to station No. 62 to initiate a conditioning period for a control cycle at that station. The conditioning period is initiated by the office upon the transmission of a mark pluse after relays CY and PC at the office have been picked up. The duration of the conditioning period is timed at the office by the operation sequentially of relays PNC, E, PNCP and PC. Field station No. 62 transmits a space character during the conditioning period in response to the mark character transmitted by the office.

For this embodiment of the present invention, the first four characters transmitted are all space characters unless an emergency shutdown has been designated. In this case, the four character is changed to a mark character to provide for the execution of the emergency shutdown control. The first and second digits are not used, and thus space characters are always transmitted during a control cycle for these digits. If the third and fourth digits are transmitted as space characters, this enables the motor at station No. 62 to continue to operate if it has been started by a prior cycle of operation.

The fifth and sixth digits of a control cycle are used to control a motor or engine at the designated field station. A mark is transmitted for the fifth code digit if the engine is to be started, while a space character is transmitted as the fifth code digit if the engine is to be stopped.

The sixth code digit is used to determine whether or not the code transmitted by the fifth digit is to be executed. The sixth digit must be opposite in character to the character of the fifth digit in order for a control to be executed. If the sixth digit is opposite in character, and other conditions are met, the next off period is made abnormally long to provide time for execution of the control. If the fifth and sixth digits are of the same character, the stepping progreses at its normal rate without the abnormally long off execution period being formed.

The field station No. 62 transmits mark and space characters alternately during the one periods of a control cycle to register at the control office that the field station apparatus is functioning properly and is in synchronism with the control office. This transmission is independent of the control code characters transmitted from the control office except that if the sixth digit is made opposite in character by the control office, as described above, the field station responds with the transmission of a character changed from the character that would normally be transmitted, and the registration of such changed character at the control office is required to permit continuation of the control cycle. If the control cycle is not permitted to continue, an indication is provided to the operator that there has been an error, and the system automatically repeats the cycle.

It is to be understood that other engines can be controlled during additional steps of the cycle according to the principles of operation shown for the control of one engine in response to codes transmitted during the fifth and sixth digits, and that other devices can be controlled in a similar manner in accordance with the requirements of practice.

*Normal conditions.*—Normally, when the system is inactive, with reference to FIG. 1C, the Station 62 Carrier Transmitter F1 is active to steadily transmit mark frequency to station No. 62, and Station 63 Carrier Transmitter F2 is normally active to steadily transmit mark frequency energy to field station No. 63. The mark is transmitted to station 62 through back contact 25 of relay STP, which connects energy from the upper left-hand terminal of Carrier Transmitter F1 to the lower left-hand terminal, which provides for the transmission of the mark frequency shift carrier. Similarly, the upper terminal of carrier transmitter F2 is connected through wire 26, front contact 27 of relay PC, and wire 28 to the lower terminal of carrier transmitter F2. With reference to FIG. 1A, relay PC is normally energized by a stick circuit including front contact 29 of relay PNCP (see FIG. 1B), wire 30, back contact 31 of relay CY, back contact 32 of relay M, back contact 33 of relay C, front contact 34 of relay PC and lower winding of relay PC. Relay PNCP (see FIG. 1B) is normally energized through back contact 35 of relay O, back contact 36 of relay E, front contact 37 of relay PNCP and upper winding of relay PNCP.

In accordance with the reception of continuous space carrier energy from the field stations during normal conditions, the relays 62CRS and 63CRS (see FIG. 1C) are normally energized because these relays are energized by the shift frequencies received from the field stations by the carrier receiver for frequencies F3 and F4 respectively. In acocrdance with the reception of space frequency energy at the control office, the space relay S is also normally energized (see FIG. 1D). The circuit for the energization of relay S includes front contact 38 of relay 63CRS front contact 309 of relay ST (see FIG. 1F), wire 39 and upper winding of relays S. Relay CYK (see FIG. 1D) is normally energized by a circuit including front contact 40 of relay PC, wire 41, front contact 42 of relay XT, wire 43 and front contact 44 of relay CYK. Relay XT (see FIG. 1E) is normally energized by a circuit including front contact 45 of relay PC, back contact 46 of relay NC, and wire 47. With reference to FIG. 3, the relay ST is normally energized by a circuit including back contact 48 of relay CY, normally closed contact 49 of push buton 62LPB, back contact 50 of relay 62CRM, back contact 51 of relay STP, lower winding of relay ST and front contact 52 of relay ST.

At the field station No. 62, the reception of the mark shift frequency energy on the carrier F1 provides for the steady energization of the relay FPP (see FIG. 2A), which is connected to the mark terminal of the Station 62 Carrier Receiver F1. The Station 62 Carrier Transmitter F3 is normally active to transmit space carrier frequency because of the connection of the power source at the upper left-hand terminal of the Carrier Transmitter F3 through wire 53, back contact 54 of relay O1, wire 55, back contact 56 of relay LS, back contact 57 of relay MO, front contact 58 of relay FPP, back contact 59 or relay MO and back contact 60 of relay ME to the space terminal of Station 62 Carrier Transmitter F3. The relay CH (see FIG. 2D) is normally energized by a circuit including back contact 61 of relay T (see FIG. 2C), back contact 662 of relay LSP, wire 563, back contact 64 of relay ESD, back contact 65 of relay RK, back contact 66 of relay VL, back contact 67 of relay VUL and Change Detector 68. The XX marks includes in the circuit described for relay CH indicate points at which additional contacts of additional devices may be inserted.

*Start of control cycle.*—To consider the start of the control cycle, it will be assumed that it is desired to transmit a control for the starting of an engine at field station No. 62. The control for starting the engine is designated by pushing the Start–PB push button illustrated in FIG. 4 to cause the picking up of the relay 62SS for selecting the proper code to be transmitted. The operator then actuates the push button 62SPB (see FIG. 3) for initiating the code communication system into a cycle of operation. Such actuation causes the dropping away of the station relay ST to select the transmission to be at the frequency F1 which is provided for communication with station No. 62. Relay ST is dropped away because of the energization of its upper winding with reverse polarity by a circuit including back contact 48 of relay CY, contact 553 of push button 62SPB, back contact 554 of relay STP and upper winding of relay ST. Upon the dropping away of relay ST, a circuit is closed to cause the picking up of relay C (see FIG. 1A). This circuit includes contact 555 of push button 62SPB (see FIG. 1C), back contact 556 of relay ST, wire 557, lower winding of relay C and back contact 558 of relay LT. The dropping away of relay ST is effective to maintain continuous transmission during the cycle to station No. 63 of mark character frequency in accordance with the closure of back contact 559 of relay ST to connect the source of carrier energy to the mark terminal of the Station 63 Carrier Transmitter F2 (see FIG. 1C).

The picking up of relay C causes the dropping away of relay PC by opening the normally energized circuit for that relay at back contact 33 of relay C. Relay PC, in dropping away, closes a circuit for the picking up of relay STP (see FIG. 3). This circuit includes back contact 560 of relay PC and back contact 561 of relay ST. Relay STP, in picking up, opens the circuit at back contact 25 (see FIG. 1C) by which the Station 62 Carrier Transmitter F1 has been effective to steadily transmit mark frequency to the field station No. 62. Thus the cycle is initiated by a line break to start the conditioning for a control cycle at field station No. 62. Field station No. 63 continues to steadily receive its mark carrier frequency.

Relay CY (see FIG. 1D) is picked up in response to the dropping away of relay PC by the energization of a circuit including back contact 662 of relay PC, back contact 663 of relay NC, upper winding of relay CY and front contact 664 of relay CYK. Relay CY is made slow to pick up because of a shunt circuit including the lower winding of relay CY and capacitor 665.

At the field station No. 62, in accordance with the initiation of the line break, the relay FPP (see FIG. 2A) becomes dropped away, and the dropping away of this relay causes the picking up of relay CY1. Relay CY1 is energized through back contact 666 of relay FPP with its two windings connected in series.

The line break is terminated at the control office by the picking up of relay PC in response to the picking up of relay CY. Relay PC (see FIG. 1A) is picked up by a circuit including front contact 667 of relay CY, back contact 668 of relay CP, front contact 69 of relay C, back contact 70 of relay NC, upper winding of relay PC, back contact 71 of relay M, front contact 72 of relay CYK, wire 73, front contact 74 of relay PNCP, wire 75, back contact 76 of relay CP and normally closed contacts 77 and 78 of the hand step switch HS. The picking up of relay PC establishes a connection from the upper left-hand terminal of Station 62 Carrier Transmitter F1 (see FIG. 1C) to its lower left-hand terminal to provide for the transmission of mark frequency carrier during the conditioning period. The circuit by which this transmission is rendered effective includes wire 79, front contact 80 of relay PC and wire 81.

During the conditioning period at the control office, the picking up of relay PC causes the dropping away of relay PNC. Relay PNC has been energized upon the dropping away of relay PC initially by a circuit including back contacts 82 and 83 of relay PC and NC respectively (see FIG. 1A). The picking up of relay PNC causes the dropping away of the relay S (see FIG. 1D). Relay S has been maintained energized by a stick circuit including front contact 84 of relay PNC, back contact 85 of relay M, front contact 86 of relay S and lower winding of relay S.

The dropping away of relay PNC causes the picking up of relay E (see FIG. 1B) by the energization of a circuit including front contact 87 of relay CY, back contact 88 of relay PNC, wire 89, lower winding of relay E and back contact 90 of relay O.

The picking up of relay E causes the picking up of relay EE by the energization of a circuit including front contact 91 of relay CY (see FIG. 1A), wire 92, front contact 93 of relay E, lower winding of relay EE and back contact 94 of relay OO. The picking up of relay E also causes the dropping away of relay PNCP by opening its stick circuit at back contact 36. Relay PNCP is slow to drop away, however, because of its shunted lower winding.

When relay PNCP becomes dropped away, the circuit by which relay PC has been maintained energized is opened at front contact 29 (see FIG. 1B), and the relay PC becomes dropped away to terminate the conditioning period and to initiate the first off period.

At the start of the conditioning period at the field station No. 62, the relay FPP (see FIG. 2A) becomes picked up, and initiates transmission of space frequency energy.

The picking up of relay FPP at field station No. 62 at the beginning of the conditioning period causes the picking up of relays LS and E1. Relay LS (see FIG. 2A) is energized through front contact 95 of relay CY1, back contact 96 of relay CYP, back contact 97 of relay LSP, lower winding of relay LS and front contact 666 of relay FPP. The picking up of this relay closes a stick circuit at front contact 98 to shunt front contact 666 of relay FPP out of the circuit just described. Relay E1 (see FIG. 2F) is picked up by the energization of a circuit including front contact 99 of relay FPP (see FIG. 2E) front contact 100 of relay CY1, wire 101, upper winding of relay E1 and back contact 102 of relay O1. The picking up of relay E1 causes the picking up of relay EE1 by the energization of a circuit including front contact 103 of relay CY1 (see FIG. 2E), wire 104, front contact 105 of relay E1, back contact 106 of relay OO1, and upper winding of relay EE1. The picking up of relay EE1 closes a stick circuit at front contact 107 to shunt contact 105 of relay E1 out of the circuit just described.

*Stepping.*—At the end of the conditioning period, the first counting relay VA (see FIG. 1B) is energized at the control office, and a corresponding relay VA1 (see FIG. 2D) is energized at the field station No. 62. The relay VA at the control office is energized in response to the dropping away of relay PNCP. The circuit by which relay VA (see FIG. 1B) is picked up includes front contact 108 of relay CY (see FIG. 1A), wire 109, back contacts 110 through 116 of relays VA through VH respectively, lower winding of relay VA, front contact 117 of relay EE, back contact 118 of relay PNCP, wire 119 and front contact 120 of relay CY. Relay VA actually becomes picked up during the off period following the conditioning period. In this off period, the relay PNC (see FIG. 1A) becomes picked up by the energization of a circuit that has been described which is closed by the dropping away of relay PC. The lower winding of relay PNC is shunted through back contact 121 to make this relay slow to pick up. Upon the picking up of relay PNC, the relay PNCP (see FIG. 1B) is picked up as a direct repeater of relay PNC. Relay PNCP is energized through front contact 122 of relay PNC and wire 123.

Relay O (see FIG. 1B) is also picked up during the first off period in response to the picking up of relay PNC through front contact 87 of relay CY (see FIG. 1A), wire 124, front contact 125 of relay E, wire 89, front contact 88 of relay PNC, wire 126 and upper winding of relay O The picking up of this relay establishes a stick circuit including the lower winding of the relay O and front contact 90 to shunt front contact 88 of relay PNC out of the circuit just described. The picking up of relay PNCP causes the picking up of a relay PC or NC (see FIG. 1A), selected in accordance with the code character to be transmitted during the first digit.

The relay PNC is an inverse repeater of the relays PC and NC, picking up at the start of each off period and releasing at the start of each on period. The relay PNCP is a direct repeater of the relay PNC, having a stick circuit provided for checking the operation of relays E and O. This relay controls the picking up and dropping away of the relays PC and NC.

The relays PNC and PNCP, together with the relays E and O form a self generating cyclic action which, once started, drives the system through its several steps. The relay PNCP times every on period, while the relays E and O are effectively frequency dividers in that these relays operate only at a rate one half that of the rate of operation of the relay PNCP. The relay E is picked up during even on period, and the relay O is picked up during odd off periods.

Relays EE and OO effectively form secondary frequency dividers in that they operate at a rate only half of the rate of operation of the relays E and O. Relay EE is picked up during alternate even on periods, and the relay OO is picked up during alternate odd on periods. By use of these relays in combination with the counting relays VA through VH, only one counting relay is required for the communication of two code digits.

At the beginning of the second off period, the relay PNC is picked up as has been heretofore described, and the picking up of that relay causes the picking up of its repeater relay PNCP and also causes the dropping away of relay O. Relay O (see FIG. 1B) is dropped away at this time because of the opening of its circuit at front contact 88 (see FIG 1A) of relay PNC. Relay E has been dropped away during the preceding on period, and thus the stick circuit including front contact 125 of relay E for the relay O is open at this time. When the relay O becomes dropped away, it closes a circuit for the picking up of a relay PC or NC that has been selected for the transmission of the next code character to terminate the second off period.

The second counting relay, relay VB (see FIG. 1B), is energized at the end of the second on period upon the dropping away of relay PNCP. The circuit by which relay VB is energized at this time includes front contact 128 of relay VA, lower winding of relay VB, front contact 129 of relay OO, back contact 117 of relay EE, back contact 118 of relay PNCP, wire 119, and front contact 120 of relay CY.

Relay VC, which is the next counting relay to be picked up, does not become energized until the end of the fourth on period. The circuit by which relay VC is energized at this time includes front contact 108 of relay CY, (see FIG. 1A) wire 109, front contact 110 of relay VB, wire 130, back contact 131 of relay 63RC, back contact 132 of relay 62RC, wire 133, lower winding of relay VC, front contact 117 of relay EE, back contact 118 of relay PNCP, wire 119 and front contact 120 of relay CY.

Counting relay VD is energized at the end of the sixth on period by a circuit including front contact 108 of relay CY (see FIG. 1A), wire 109, back contact 110 of relay VD, front contact 111 of relay VC, lower winding of relay VD, front contact 129 of relay OO, back contact 117 of relay EE, back contact 118 of relay PNCP, wire 119, and front contact 120 of relay CY. The energization of additional counting relays takes place in a similar manner to that which has been described.

Stick circuit means is provided for maintaining the counting relays VA through VH energized respectively through two-adjoining on periods, with the release of the relays being effective during the following on periods. Relay VA has two stick circuits, the first of which includes front contact 134 of relay VA, upper winding of relay VA, front contact 135 of relay EE, wire 119, and front contact 120 of relay CY. This stick circuit is maintained closed until the dropping away of the relay EE during the second on period and a second stick circuit is provided to maintain the relay VA energized until the dropping away of the relay OO during the third on period. This stick circuit includes front contact 134 of relay VA, upper winding of relay VA, front contact 136 of relay OO, wire 119, and front contact 120 of relay CY.

Relay VB is maintained energized through the third and fourth on periods and is deenergized upon the picking up of relay OO during the fifth on period. One stick circuit for the relay VB includes front contact 137 of relay CY, wire 138, front contact 139 of relay VB, upper winding of relay VB, back contact 135 of relay EE, wire 119 and front contact 120 of relay CY. The other stick circuit for relay VB includes front contact 137 of relay CY, wire 138, front contact 139 of relay VB, upper winding of relay VB, back contact 136 of relay OO, wire 119, and front contact 120 of relay CY. The stick circuits for the other counting relays are comparable to the stick circuits that have been described, the relays being energized alternately through the front and back contacts of the relays EE and OO. It will be noted that stick energy for the relay VD is taken through front contact 137 of relay CY, and that also stick energy for the relay VH is taken through this contact. This is to provide proper timing during the clearing out at the end of a cycle, whether the cycle is normal or whether a recheck control has been designated, which causes an under step of the system and causes the system to be clear out during the fifth digit.

Upon consideration of the circuits that have been described for the counting relays VA through VH, it will be noted that the checking of back contacts of the counting relays in the pick up circuit is to insure that only one counter at a time will become picked up. Each counter except relay VA requires that the preceding counter relay be up, opening the circuit to the remaining counter relays. The contacts 135 and 136 of relays EE and OO in the stick circuits for the counting relays are used to provide the proper sequencing for releasing the counting relays during the counting operation. This provides that relays VB, VD and VF are dropped away upon the picking up of the relay OO in the proper digits, and the relays VA, VC, VE and VG are dropped away by the dropping away of relay OO in the proper digits.

It will be apparent from the above described mode of operation that another counting relay is energized in every even numbered on digit (relay VA being energized in the conditioning period), and that relay is deenergized in the second following odd numbered on period. The relay VB, for example, is energized in the second on period and is dropped away in the fifth on period.

For the purpose of simplification, the circuits for the counting relays VA1 through VH1 at the typical field station No. 62 have not been shown, but it is to be understood that these circuits can be provided in a manner similar to that which has been shown and described in detail for the control of the counting relays at the control office, these relays being controlled by the relays EE1 and OO1 (see FIG. 1F) in a manner corresponding to that which has been heretofore considered.

*Control Code Transmission.*—The relays PC and NC (see FIG. 1A) control the keying of the carrier transmitters at the control office in accordance with instruction received from control code make up circuits (see FIG. 4). In a control cycle, there is one condition that must be satisfied before the system proceeds from an odd digit to an even digit. This condition is that the control office must receive a mark character from the field. In order to proceed from an even to an odd digit, either one of two conditions must be satisfied. If there is no command to execute a control, a relay PX or NX will be picked up in the office and the execution relay X must be in its dropped away position at the field station. Under these conditions, the field transmits a space character to the control office. If a command to execute a control has been set up and the relay X is picked up at the field station, the relays PX and NX at the control office must both be in their dropped away positions. In accordance with this condition, the control office should receive a mark character from the field, and if this character is received, the control office will advance to the next odd digit after a predetermined time interval which is provided for execution purposes by the relay XT at the control office.

The code characters transmitted from the control office during the respective digits of a control cycle is determined by the selective energization of the code bus wires EPC, OPC, ENC and ONC (see FIGS. 1A and 4). These buses are provided for even mark, odd mark, even space and odd space transmission respectively. The selective energization of the relays PC and NC for keying the character at the control office during a control cycle is dependent upon proper conditioning of the integrity checking relays PX and NX in accordance with the reception of code characters from the field indicative of proper actuation of the code communication apparatus at the field station. Relay PX (see FIG. 1D) is picked up initially in a control cycle in response to the picking up of relay C by the energization of a circuit including back contact 140 of relay CP, front contact 141 of relay C, wire 142, wire 143, and lower winding of relay PX. Relay PX is maintained energized throughout the conditioning period, and becomes deenergized upon the picking up of relay CP to open its back contact 140 during the first off period. Relay PX is made slow to drop away because of the shunting of the upper winding of that relay in series with the upper winding of relay NX so that it does not actually become dropped away until the beginning of the first on period. The circuit by which relay CP (see FIG. 1A) is picked up upon the dropping away of the relay PNCP at the end of the conditioning period includes back contact 144 of relay PNCP, wire 145, front contact 146 of relay C and lower winding of relay CP.

With reference to FIG. 4, it is determined that the first on period is a space by energy applied through front contact 147 of relay CY, front contact 148 of relay E, back contact 149 of relay OO, and front contact 150 of relay VA. Energy thus supplied to the bus wire ONC of FIG. 1A, is effective to energize relay NC through normally closed contact 151 of hand-step switch HS, front contact 152 of relay PX, front contact 153 of relay S, lower winding of relay NC, back contact 154 of relay PC, front contact 155 of relay CP, back contact 71 of relay M, front contact 72 of relay CYK, wire 73, front contact 74 of relay PNCP, wire 75, and front contact 156 of relay PX. Relay NC is maintained energized until the end of the first on period by a circuit including front contact 29 of relay PNCP (see FIG. 1B), wire 30, front contact 31, of relay CY, front contact 157 of relay NC, and upper winding of relay NC. The closure of front contact 158 of relay NC (see FIG. 1A) connects the source of energy for Station 62 Carrier Transmitter F1 to the space terminal of the transmitter for transmitting a shift frequency corresponding to a space character to field station No. 62.

With reference to FIG. 4, the second digit of the control cycle is determined to be always a space digit because of energy applied to the space even bus ENC through front contact 147 of relay CY, back contact 148 of relay E, front contact 159 of relay EE, and front contact 160 of relay VA. Relay NC (see FIG. 1A) is picked up because of energy applied to wire ENC as has been described in FIG. 4 and feeding through a circuit including normally closed contact 161 of hand step switch HS, front contact 162 of relay M, lower winding of relay NC, back contact 154 of relay PC, front contact 155 of relay CP, front contact 163 of relay C, front contact 71 of relay M, front contact 72 of relay CYK, wire 73, front contact 74 of relay PNCP, wire 75, back contact 156 of relay PX, and front contact 164 of relay NX. Relay NC is maintained picked up by the stick circuit for this relay that has been described until the opening of front contact 29 of relay PNCP when that relay drops away to terminate the second on period.

The third on period is also made to be always a space character. This is to provide a check of the integrity of the line circuit communication system. Inasmuch as a mark is normally transmitted during a period of rest over the line circuit, it could be possible that a series of momentary interruptions of the line circuit could be interpreted as the start of a cycle. Thus is is provided according to the present system that the first three elements of a station code are always space characters as distinguished from a mark character normally transmitted in a period of rest, so that it is required that a field station receive a series of space pulses, as distinguished from a series of mark pulses that might be created by interruptions in the line circuit, to insure that the code is being received from the transmitting station. Thus, with reference to FIG. 4, the third on period is made to be a space character by the application of energy to the wire ONC through front contact 147 of relay CY, front contact 148 of relay E, front contact 149 of relay OO, and front contact 165 of relay VB. Such energization is effective to energize the relay NC for the transmission of a space digit in the same manner as has been heretofore described for the energization of relay NC in accordance with energy applied to the control bus wire ONC.

The fourth on period is used for control purposes, and a mark or a space charatcer is selectively transmitted in accordance with the condition of an emergency shutdown relay 62ESDP. Assuming that the relay 62ESDP is in its dropped away position to permit an engine at station No. 62 to continue to operate, a space character is transmitted during the fourth on period in accordance with energy applied to the bus wire ENC through front contact 147 of relay CY, back contact 148 of relay E, back contact 159 of relay EE, front contact 166 of relay VB, front contact 167 of relay STP, and back contact 168 of relay 62ESDP. Should the relay 62ESDP be in its picked up position in accordance with the desigation of an emergency shutdown condition for the engine at field station No. 62, the bus wire EPC becomes energized in accordance with the closure of front contact 168 of relay 62ESDP rather than the energization of the bus wire ENC as has been described. The circuit by which relay PC (see FIG. 1A) is energized from the bus wire EPC includes normally closed contact 169 of hand step switch HS, front contact 170 of relay M, back contact 70 of relay NC, upper winding of relay PC, front contact 163 of relay C, front contact 71 of relay M, front contact 72 of relay CYK, wire 73, front contact 74 of relay PNCP, wire 75, back contact 156 of relay PX and front contact 164 of relay NX. When this relay is picked up, it is maintained energized by a stick circuit until the dropping away of the relay PNCP at the end of the fourth on period. This circuit includes front contact 29 of relay PNCP (see FIG. 1B), wire 30, front contact 31 of relay CY, back contact 157 of relay NC, and front contact 34 of relay PC. If the field station No. 63 is selected for communication rather than the station No. 62, the control of transmission during the fourth on period is selected through back contact 167 of relay STP (see FIG. 4) and through contact 569 of the emergency shutdown relay 63ESDP.

A mark or space character is transmitted during the fifth on period in accordance with whether the control designated is to start or stop a motor or engine at field station No. 62 or 63. If the field station No. 62 is selected, and an engine start control has been designated by the picking up of relay 62SS (see FIG. 4), the bus wire OPC is energized through front contact 147 of relay CY, front contact 148 of relay E, back contact 149 of relay OO, front contact 570 of relay VC, front contact 171 of relay STP, and front contact 172 of relay 62SS. It will be noted that relay 62SS is maintained picked up through its stick contact 173 until a stop control is designated to open the circuit for the lower winding of this relay by the actuation of the Stop-PB push button to open contact 174 in the stick circuit. If a stop control is designated, the opening of contact 174 by the actuation of the stop push button provides for the dropping away of relay 62SS, and in accordance therewith, the fifth on period is selected to be a space character in accordance with energy applied through back contact 172 of relay 62SS, to the wire ONC.

With reference to FIG. 1A, the application of energy to the bus wire OPC provides for the energization of the relay PC through normally closed contact 175 of hand step switch HS, back contact 176 of relay PX, front contact 177 of relay NX, front contact 178 of relay S, back contact 70 of relay NC, upper winding of relay PC, front contact 155 of relay CP, back contact 163 of relay C, front contact 71 of relay M, front contact 72 of relay CYK, wire 73, front contact 74 of relay PNCB, wire 75, back contact 156 of relay PX, and front contact 164 of relay NX. Relay PC is maintained picked up until the dropping away of the relay PNCP to terminate the fifth on period by the energization of a circuit that has been described.

Having thus considered the control of the relays PC and NC selectively for the transmission of typical codes involving selective application of energy to the code control wires ENC, ONC, EPC, and OPC, it should be readily apparent that a similar mode of operation is employed in the selection of codes for the transmission of controls for other devices in accordance with the requirements of practice.

*Field station reception of control codes.*—As was pointed out when considering the initiation of a control cycle, the location selection relay LS (see FIG. 2C) is picked up at a field station during the conditioning period of a control cycle, provided that mark energy is received over the line circuit from the control office. A stick circuit through front contact 95 of relay CY1, wire 179, back contact 180 of relay VC1, wire 181, front contact 182 of relay LS, back contact 97 of relay LSP, lower winding of relay LS, and front contact 666 of relay FPP, maintains relay LS picked up until the picking up of relay LSP. Another energizing circuit for relay LS is established upon the picking up of relay LSP extending through front contact 95 of relay CY1, wire 179, back contact 183 of relay VA1, wire 184, front contact 97 of relay LSP, lower winding of relay LS, and front contact 98 of relay LS. The purpose of the stick circuits through the contacts to relays VA and VC is to provide a means to detect a counter failure and stop the delivery of controls. If a counter fails to pick up, the result will be a repicking up of relay VA, which in turn will release relay LS, preventing execution of the control. The dropping away of relay LS under these conditions will prevent an inbound mark transmission thereby releasing the relay CYK at the control office to terminate the cycle. The relay LS is normally maintained picked up throughout the reception of a control cycle.

With reference to FIG. 2A, the relays FPP and FNP are actuated in accordance with the reception of mark and space code elements respectively from the control office. These relays in turn cause the picking up of associated code receiving relays PC1 and NC1 respectively. The only time that energy is available for the picking up of a relay PC1 or NC1 is in an odd digit, with either relay FPP or relay FNP picked up. Once a relay PC1 or NC1 is picked up, it is retained by a stick circuit carried through a back contact of the other relay.

To consider specifically the mode of operation of the system at a typical field station, it will be assumed that the field station No. 62 receives the space character transmitted by the control office during the first on period. In accordance with this reception, the relay FNP becomes picked up at the beginning of the first on period, and the picking up of this relay causes the dropping away of relay E1 (see FIG. 2F). This relay has been maintained energized up to this point by a stick circuit including front contact 200 of relay CY1, (see FIG. 2E), wire 201, front contact 202 of relay E1, wire 203, back contact 204 of relay FPP, back contact 205 of relay FNP, wire 206, and lower winding of relay E1. The opening of back contact 205 of relay FNP upon the picking up of that relay in response to the first on energization transmitted from the control office causes the dropping away of relay E1.

The reception of the space character during the first code digit causes the picking up of relay NC1 (see FIG. 2E) in accordance with the picking up of the relay FNP. The circuit by which relay NC1 is picked up at this time includes front contact 207 of relay FNP (see FIG. 2E), upper winding of relay NC1, wire 208, front contact 209 of relay O1, wire 210, front contact 211 of relay LS, back contact 212 of relay FPP, and front contact 213 of relay FNP. Relay NC1 is maintained energized by a stick circuit including front contact 214 of relay CY1, front contact 215 of relay CYP, lower winding of relay NC1, front contact 216 of relay NC1 and back contact 217 of relay PC1. Relay CYP is in its picked up position to close front contact 215 in the circuit just described because of its energization during the conditioning period upon the picking up of relay EE1. The circuit by which relay CYP is picked up in the conditioning period includes front contact 218 of relay CY1, wire 219, back contact 220 of relay VH1, front contact 221 of relay EE1, wire 222, and upper winding of relay CYP. This relay is maintained energized by a stick circuit for its lower winding including front contact 223 of relay CYP, and front contact 224 of relay CY1.

The field station No. 62 is operable to transmit a mark character during the first on period of the control cycle it is receiving from the control office in accordance with the dropping away of the relay E1 at the beginning of the period to close a circuit for energization of the mark terminal of Station 62 Carrier Transmitter F3 (see FIG. 2A). The circuit by which energy is applied to this terminal from the upper left hand terminal of Station 62 Carrier Transmitter F3 includes wire 53, front contact 54 of relay O1, wire 226, front contact 227 of relay LS, front contact 228 of relay NC1, wire 229, back contact 230 of relay E1, and wire 231. It will be noted that the transmission of a mark character during the first on period from the field station as has been described is dependent upon checking the normal operation of the system for initiating the cycle and checking that the relay NC1 has been picked up in response to the space character that has been transmitted from the control office. The mark character is terminated by the dropping away of relay O1 (see FIG. 2F) to open the circuit that has been described for the transmission of the mark character at front contact 54 (see FIG. 2B). Relay O1 is dropped away because of the dropping away of the relay FNP at the end of the space pulse transmitted during the first digit from the control office. The stick circuit that is opened at this time for the relay O1 includes front contact 200 of relay CY1 (see FIG. 2E), back contact 232 of relay FPP, front contact 233 of relay FNP, wire 203, lower winding of relay O1 and front contact 102 of relay O1.

In a similar manner, a mark character is transmitted from the field station for each odd digit, irrespective of the code character received from the control office. In order that a mark character can be transmitted when a mark is received from the control office, front contact 234 of relay LSP (see FIG. 2A) shunts the front contact 228 of relay NC1. Also the stick circuit for relay O1 includes front contact 232 of relay FPP so that the relay O1 is maintained picked up in accordance with the reception of either a mark or a space character from the control office.

It is provided that a space character is transmitted from the field station to the control office during each even on period, irrespective of the code character that is received from the control office during that period, except as hereinafter pointed out. In accordance with the picking up of relay FNP at the field station No. 62 in response to the second digit transmitted from the control office, the relay E1 (see FIG. 2F) becomes picked up by the energization of a circuit including back contact 99 of relay FPP, front contact 534 of relay FNP, front contact 100 of relay CY1, wire 101, upper winding of relay E1 and back contact 102 of relay O1. This relay, when picked up, is maintained energized throughout the following off period by a stick circuit that has been described including back contacts 204 and 205 of relays FPP and FNP respectively. When one of these relays becomes picked up at the beginning of the third digit, the relay E1 becomes dropped away. Energy is applied to the mark terminal of the Station 62 Carrier Transmitter F3 at the beginning of the third on period through a circuit that has been described.

A space character is transmitted from the field station to the control office during the second on period of a control cycle in accordance with the picking up of relay E1 in response to the reception of a control pulse from the control office. The circuit by which energy is applied to the space terminal of Station 62 Carrier Transmitter F3 (see FIG. 2A) at this time includes wire 53, back contact 54 of relay O, wire 55, front contact 56 of relay LS, back contact 235 of relay CD, wire 236, front contact 237 of relay E1, wire 238, and back contact 239 of relay X. This space character is transmitted until the picking up of the relay O1 to open the circuit for the Station 62 Carrier Transmitter F3 at back contact 54 (see FIG. 2B). The relay O1 is picked up during the third off period in accordance with the relays FP and FNP both being in their dropped away positions. A space character is similarly transmitted by the field Station 62 Transmitter F3 during each subsequent even number on period. An exception to this predetermined pattern of transmission by the field station is the changing of a character to a mark in an execution period as will be hereinafter considered.

Relays PC1 and NC1 (see FIG. 2E) register and store the code characters received as the odd numbered digits by the relays FPP and FNP respectively. Once a relay PC1 or NC1 is picked up, it is maintained energized until the relay for the opposite character is picked up during an odd digit. Thus the relay NC1, for example which has been described as being picked up upon reception of the first digit, is maintained picked up by a stick circuit until the relay PC1 is picked up during some subsequent odd numbered digit. The stick circuit for relay NC1 includes front contact 214 of relay CY1, front contact 215 of relay CYP, lower winding of relay NC1, front contact 216 of relay NC1, and back contact 217 of relay PC1. Front contact 240 of relay LSP is connected in multiple with front contact 215 of the relay CYP in the circuit thus described. Inasmuch as the relays PC1 and NC1 can be picked up only when front contact 209 of relay O1 is closed, these relays cannot have their positions changed during the even digits, and therefore their position during an even digit registers the character that was received during the prior odd digit.

The execution relay X (see FIG. 2E) is controlled by the relays FPP, FNP, O1, PC1 and NC1 jointly in such a manner that the relay X can be picked up only during an even numbered digit and only provided that the character received during this digit from the control office is opposite in character to the character received during the preceding digit. Thus, for example, if a mark is received during an even numbered digit following the reception of a space character during the prior digit, relay X is energized through back contact 207 of relay FNP, front contact 212 of relay FPP, front contact 211 of relay LS, wire 210, back contact 209 of relay O1, wire 241, front contact 242 of relay CYP, front contact 243 of relay NC1, back contact 244 of relay PC1, lower winding of relay X and back contact 245 of relay PC1, to (—). Relay X is maintained picked up during the following off period by a circuit including back contact 246 of relay FPP, back contact 247 of relay FNP, front contact 248 of relay CY1, front contact 249 of relay X and upper winding of relay X.

If a space character is received during an even digit following the transmission of a mark character, the relay X becomes picked up by the energization of a circuit including front contact 244 of relay PC1, lower winding of relay X, front contact 245 of relay PC1, back contact 243 of relay NC1, front contact 242 of relay CYP, wire 241, back contact 209 of relay O1, wire 210, front contact 211 of relay LS, back contact 212 of relay FPP and front contact 213 of relay FNP.

The picking up of relay X changes the code character being transmitted from the field station to the control office by the shifting of contact 239 (see FIG. 2A) in the circuit for the control of the field station transmitter.

*Delivery of controls.*—The delivery of controls is illustrated in FIGS. 2E and 2F for the control of an emergency shut down relay ESD and also for the control of motor start and stop solenoids STD and SD respectively. These application devices can be controlled only during an off period following the picking up of the execution relay X during an even number digit.

If an emergency shut down control has been designated, for example, the third digit of the code is a space digit and the fourth digit is a mark digit, thus the relay X becomes picked up during the fourth digit and the relay NC1 is in its picked up position. Under these conditions relay ESD (see FIG. 2F) becomes energized by a circuit including front contact 250 (see FIG. 2E) of relay NC1, back contact 251 of relay PC1, front contact 252 of relay X, wire 253, back contact 254 of relay OO1, lower winding of relay ESD, front contact 255 of relay VB1, back contact 256 of relay VA1, wire 257, back contact 258 of relay PC1, and front contact 259 of relay NC1. Relay ESD, when picked up, is maintained energized by a stick circuit including normally closed contact 260 of push button ESD–PB, front contact 261 of relay ESD and upper winding of relay ESD.

It has been pointed out that the code character transmitted during the fifth digit is a mark or a space character in accordance with whether a control is designated to start or stop a motor, or engine. If a mark is transmitted from the office during the fifth digit for the starting of an engine at field station No. 62, the relay PC1 is picked up during the fifth digit and is maintained energized throughout the sixth digit. In accordance with the system for execution of the control, if the control designated is registered at the control office as being out of correspondence with the indication as to the condition of the corresponding engine, a space character is transmitted during the sixth digit, and thus a condition is established for the picking up of the execution relay X. The control for starting the engine is thus executed during the following off period by the energization of the start solenoid STD (see FIG. 2F). The circuit by which the solenoid STD is energized includes front contact 251 of relay PC1 (see FIG. 2E), back contact 250 of relay NC1, wire 262, back contact 263 of relay VA1, back contact 264 of relay VB1, front contact 265 of relay VC1, winding of solenoid STD, front contact 254 of relay OO1, wire 253, front contact 252 of relay X, back contact 259 of relay NC1, and front contact 258 of relay PC1. The energization of this solenoid starts the motor at field station No. 62 and an indication in transmitted to the control office that the motor has been started.

If the control communicated to the field station No. 62 is for the stopping of the engine at that station, the fifth character transmitted is a space character, and the sixth character is a mark character. Under these conditions the stop solenoid SD (see FIG. 2F), is energized during the execution period at the end of the sixth digit by a circuit including front contact 250 of relay NC1 (see FIG. 2E), back contact 251 of relay PC1, front contact 252 of relay X, wire 253, front contact 254 of relay OO1, solenoid SD, front contact 266 of relay VC1, back contact 255 of relay VB1, back contact 256 of relay VA1, wire 257, back contact 258 of relay PC1 and front contact 259 of relay NC1.

*Clear-out at end of control cycle.*—After the control cycle has progressed into the sixteenth on period, the relay C, at the control office (see FIG. 1A), which has been maintained energized by a stick circuit throughout the cycle becomes dropped away. The stick circuit by which the relay C has been energized includes front contact 267 of relay CY (see FIG. 1A), wire 268, back contact 269 of relay VH, wire 270, back control 271 of relay 62RC, back contact 272 of relay 63RC, wire 273, upper winding of relay C, front contact 274 of relay C, and back contact 558 of relay LT. The circuit just described is opened at back contact 269 of relay VH when the counting relay VH is picked during the fourteenth on period. Stick energy is maintained on the relay C, however, through another circuit including front contact 267 of relay CY, wire 268, back contact 275 of relay EE, wire 273, upper winding of relay C, front contact 274 of relay C, and back contact 558 of relay LT. The picking up of the relay EE in the sixteenth on period opens the stick circuit just described at front contact 275 to cause the relay C to be dropped away. A further stick circuit is provided for the relay C for use in the first part of the control cycle to maintain the relay C energized until the relay CY becomes picked up to close its front contact 267. This stick circuit includes front contact 144 of relay PNCP (see FIG. 1B), wire 276, back contact 277 of relay CY, front contact 278 of relay C, back contact 279 of relay CP, lower winding of relay C, and back contact 558 of relay LT. Energy is also applied to this stick circuit through back contact 280 of relay PC. This stick circuit is open in the sixteenth on period at back contact 279 of the relay CP.

Relay PC (see FIG. 1A) becomes picked up to terminate the last off period by the energization of a circuit including front contact 667 of relay CY, back contact 668 of relay CP, front contact 69 of relay C, back contact 70 of relay NC, upper winding of relay PC, back contact 72 of relay CYK, wire 73, front contact 74 of relay PCNP, wire 75, back contact 156 of relay PX and front contact 164 of relay NX. The opening of back contact 82 of relay PC in the pick up circuit for the relay PNC causes the dropping away of that relay. The stick circuit for relay PNC including contact 281 of relay O (see FIG. 1B), contact 282 of relay E, front contact 283 of relay PNCP, wire 284, front contact 285 of relay PNC and upper winding of relay PNC is opened at this time because the relays E and O are both in their picked up positions. The dropping away of relay PNC causes the dropping away of relay S (see FIG. 1D) by the opening of its circuit at front contact 84 of relay PNC.

Because of relay CY (see FIG. 1D) being energized only during off periods, it is deenergized upon the picking up of relay PC to terminate the last off periods by the opening of its circuit at back contact 62, and the timing circuit including the capacitor 665 associated with the lower winding of relay CY provides for the dropping away after a substantially long time interval of the relay CY to terminate the clear out period.

At field station No. 62, the reception of mark energy at the beginning of the clear out period causes the picking up of relay FPP, FIG. 2A and in accordance with the picking up of this relay, the relay E1, (see FIG. 2F) becomes dropped away by the opening of its stick circuit at back contact 204 of relay FPP (see FIG. 2E). The picking up of relay FPP during the clear out period also causes the picking up of relay PC1 (see FIG. 2E) by the energization of a circuit including back contact 207 of relay FNP, front contact 212 of relay FPP, front contact 211 of relay LS, wire 210, front contact 209 of relay O1, wire 286, lower winding of relay PC1 and back contact 213 of relay FNP. The picking up of relay PC1 causes the dropping away of relay NC1 by opening its circuit at the back contact 217 of relay PC1.

In accordance with the dropping away of relay E1 during the clear out period, the relay OO1 (see FIG. 2F) becomes picked up by the energization of a circuit including front contact 103 of relay CY1, wire 104, back contact 105 of relay E1, front contact 287 of relay EE1, lower winding of relay OO1, wire 288, back contact 289 of relay LSP, bacf contact 290 of relay CD, and front contact 291 of relay NC1. The relay NC1 becomes dropped, as has been described in accordance with the picking up of relay PC1, but the relay OO1 has time to be picked up before the relay NC1 becomes dropped away. When relay OO1 becomes picked up, it is maintained energized by a stick circuit including front contact 103 of relay CY1, wire 104, front contact 107 of relay EE1, front contact 106 of relay OO1 and upper winding of relay OO1. The picking up of relay OO1 causes the dropping away of relay VH by the opening of a circuit for this relay which is not shown for the purpose of simplification of the disclosure of the present invention.

Relay CY1 (see FIG. 2C) is comparable to relay CY of FIG. 1D in the control office in that it is energized only during the off periods of the cycle. Thus it is de-energized by the picking up of relay FPP at the beginning of a clear out period. At the field station No. 62 relay CY1 is made slow to drop away so as to time the clear out period, but it is made relatively quicker to drop away than the relay CY at the control office so that the clearing out at the field station will be completed before the clearing out at the control office. Relay CY1 is made slow to drop away by the shunting of its lower winding with capacitor 292.

Relays O1, EE1 and OO1 (see FIG. 2F) become dropped away in accordance with the opening of their circuits by the dropping away of relay CY1 at front contacts 103 and 200. The dropping of relay CY1 also causes the dropping away of relay LS (see FIG. 2C) by opening the circuit for relay LS at front contact 95. Relay LS is made slow to drop away by the shunting of its upper winding by rectifier 293, and the dropping away of this relay completes the clearing out at field station No. 62 by applying space character energization to the line circuit according to the normal conditions during a period of rest.

At the control office, the reception of the space character energization causes the picking up of relay 62CRS (see FIG. 1C) and the picking up of this relay provides for the energization of the space character relay S (see FIG. 1D) by a circuit that has been described. Subsequent to the picking up of the relay S, the relay CY becomes dropped away, and the dropping away of this relay causes the dropping away of relays E and O (see FIG. 1B) by the opening of their stick circuits at front contact 87 (see FIG. 1A). Relay CY causes the dropping away of relay EE (see FIG. 1B) by the opening of its stick circuit at front contact 91 (see FIG. 1A). Relay VH (see FIG. 1B) is dropped away by the picking up of relay CY in accordance with the opening of its stick circuit at front contacts 120 and 137 of relay CY. The stick circuit by which the relay VH has been maintained energized includes front contact 137 of relay CY, wire 138, front contact 294 of relay VH, upper winding of relay VH, wire 119, and front contact 120 of relay CY.

With reference to FIG. 3, the station relay STP becomes dropped away in response to the dropping away of relay CY. This relay has been maintained energized through front contact 295 of relay CY, and back contact 561 of relay ST throughout the control cycle. Upon the dropping away of relay STP, relay ST becomes picked up by the energization of a circuit including back contact 48 of relay CY, normally closed contact 49 of the light test push button 62LPB, back contact 50 of relay 62CRM, back contact 51 of relay STP, lower winding of relay ST, and back contact 296 of light test relay LT. This relay, when picked up, is maintained energized by a stick circuit including front contact 52 of relay ST which shunts back contact 296 of relay LT out of the circuit just described.

With reference to FIG. 1A, the relay CP becomes de-energized by the dropping away of relay CY at the end of the clear out period upon the opening of front contact 667. Relay CP is made slow to drop away by the shunting of its upper winding, and after the relay CP has become dropped away, the relay PX (see FIG. 1D) is dropped away by the opening of its circuit at front contact 140 of relay CP. The stick circuit by which relay PX is maintained energized at this time includes front contact 140 of relay CP, back contact 297 of relay NC, front contact 298 of relay PX, wire 142, wire 143, and lower winding of relay PX. The dropping away of relay PX completes the operation of the system during the clearing out period following the communication of a control cycle.

*Start of an indication cycle.*—An indication cycle is automatically started in response to a change in the position of any device having a contact included in the control circuit for the change relay CH (see FIG. 2D). Thus it may be assumed, for example, that the engine run indication relay RK, for example, has become picked up in accordance with the starting of an engine at field station No. 62. The shifting of contact 65 in the control circuit for relay CH causes the dropping away of that relay.

The transmit control relay T (see FIG. 2C) becomes picked up in response to the dropping away of the relay CH by the energization of a circuit including back contact 299 of relay CH (see FIG. 2D), wire 300, back contact 301 of relay CD, back contact 302 of relay CYP, upper winding of relay T and back contact 303 of relay CY1.

In response to the picking up of relay T, the relay ME (see FIG. 2A) becomes picked up for the transmission of mark frequency to the control office. The circuit by which the relay ME is picked up includes back contact 304 of relay CY1, back contact 305 of relay CD, upper winding of relay ME, front contact 306 of relay T, wire 307, and back contact 308 of relay O1. The picking up of relay ME terminates the transmission of space frequency by the station 62 carrier transmitter F3 upon the opening of its back contact 60, and the closure of front contact 60 applies energy to the mark terminal of station 62 carrier transmitter F3 to change the character of energy transmitted from field station No. 62 to the control office from space frequency to mark frequency.

With reference to FIG. 1C, the changing of the frequency received from field station No. 62 causes the dropping away of relay 62CRS and the picking up of relay 62CRM (see FIG. 1C). With reference to FIG. 3, the picking up of relay 62CRM opens a circuit by which the station relay ST has been maintained energized at back contact 50 to cause the dropping away of that relay. The dropping away of the station relay ST at the control office deenergizes the relay S (see FIG. 1D) and energizes the relay M. Relay S is deenergized by the opening of the circuit by which it is normally energized at front contact 309 of relay ST (see FIG. 1F). Relay M becomes picked up by the energization of a circuit including back contact 310 of relay ST (see FIG. 1F), front contact 311 of relay 62CRM, wire 312, front contact 313 of relay CYK, and upper winding of relay M.

The picking up of relay M causes the dropping away of relay PC (see FIG. 1A) by the opening of its circuit at back contact 32. The dropping away of relay PC causes the picking up of relay STP (see FIG. 3) by the energization of a circuit for its upper winding including back contact 60 of relay PC, back contact 61 of relay ST and upper winding of relay STP. With reference to FIG. 1A, the picking up of relay STP opens the circuit at back contact 25 which is normally closed for rendering the station 62 carrier transmitter F1 active to transmit mark carrier frequency. Thus the transmission to field station No. 62 is interrupted at this time.

Figure 2C:
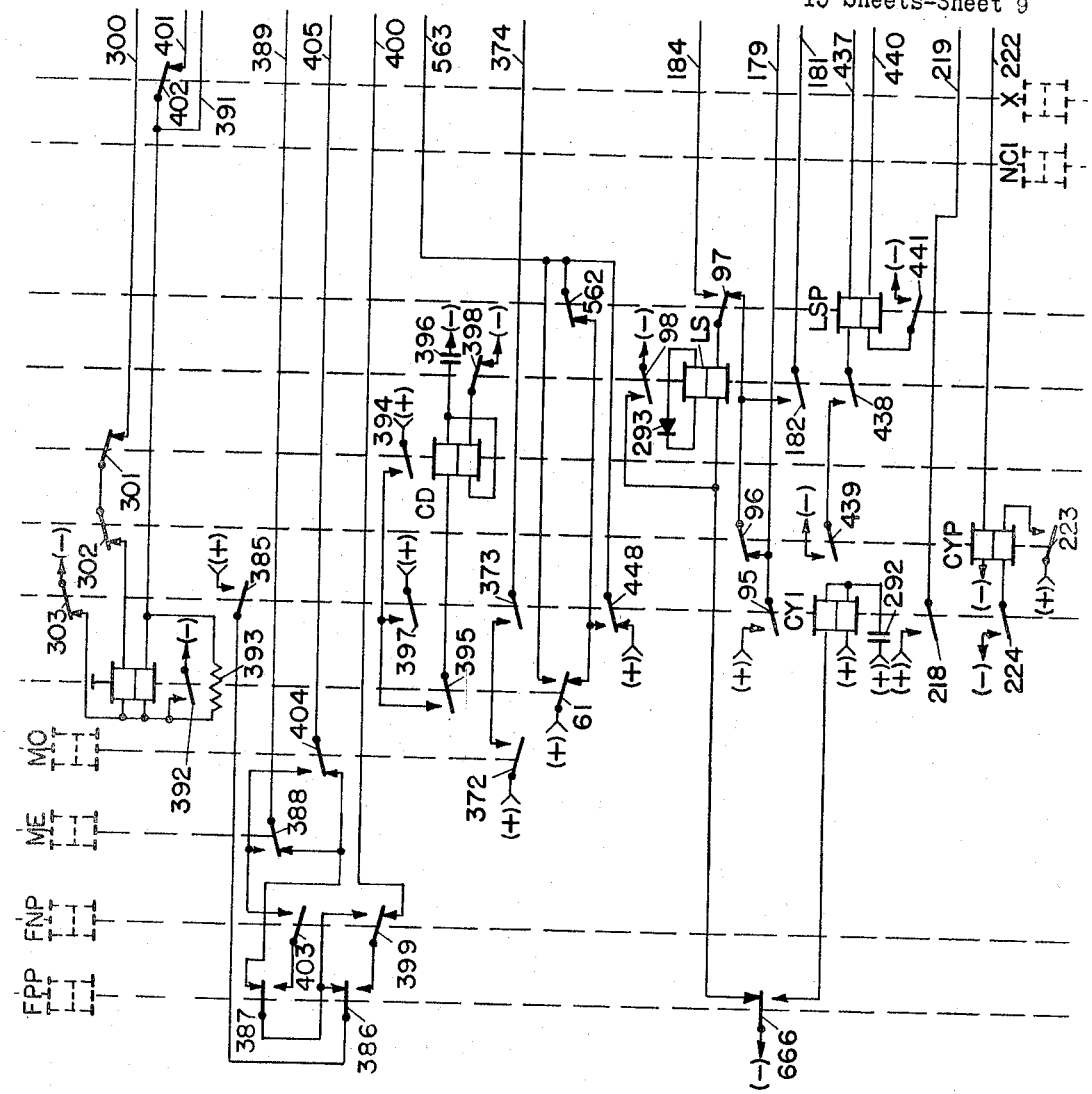

In accordance with the termination of mark character transmission to station No. 62, the relay FPP (see FIG. 2A) becomes dropped away, and the dropping away of this relay closes a circuit for the energization of relay CY1 (see FIG. 2C). This circuit includes the windings of relay CY1 connected in series and back contact 666 of relay FPP. The picking up of relay CY1 causes the dropping away of relay ME (see FIG. 2A) by the opening of its circuit at back contact 304. The closure of back contact 304 of relay CY1 provides for the energization of relay MO at this time through wire 314, wire 315, back contact 316 of relay CYP, upper winding of relay MO, and front contact 317 of relay T. This completes the operation for conditioning at the field station No. 62 until the control office again applies energy to the line circuit.

At the control office, the relay CY (see FIG. 1D) becomes energized by the dropping away of the relay PC, but the relay CY is slow to pick up, and thus the relay CY provides sufficient time for the sequence of operations that have been described to become effective. Relay CY is energized by a circuit that has been described including back contact 662 of relay PC, back contact 663 of relay NC, upper winding of relay CY and front contact 664 of relay CYK. A shunt circuit including the capacitor 665 and both windings of the relay CY in series provides the slow action in the picking up of relay CY. When relay CY becomes picked up, a circuit is closed for the energization of relay NC (see FIG. 1A) including front contact 318 of relay CY, back contact 319 of relay CP, lower winding of relay NC, back contact 154 of relay PC, back contact 163 of relay C, front contact 71 of relay M, front contact 72 of relay CYK, wire 73, front contact 74 of relay PNCP, back contact 320 of relay XT, wire 321, and normally closed contacts 77 and 78 of the hand step switch HS. The picking up of relay NC terminates the line break and starts the conditioning period by the closure of front contact 158 to transmit mark frequency energy to field station No. 62.

The picking up of relay NC at the control office causes the dropping away of relay PNC by opening the circuit for that relay at back contact 83. Relay PNC in dropping away causes the picking up of relay E (see FIG. 1B) and the dropping away of relay M (see FIG. 1D). The circuit by which the relay E is picked at this time has been described when considering the mode of operation of the system for the initiation of a control cycle. Relay M becomes dropped away by the opening of its stick circuit at front contact 84 of relay PNC. The stick circuit by which relay M has been maintained picked up includes back contact 322 of relay C, back contact 323 of relay CP, lower winding of relay M, back contact 324 of relay S, front contact 85 of relay M, and front contact 84 of relay PNC.

In response to the picking up of relay E, the relay EE (see FIG. 1B) becomes picked up by the energization of a circuit that has been described, and the relay PNCP (see FIG. 1B) becomes dropped away by the opening of its stick circuit at back contact 36 of relay E. Upon the dropping away of relay PNCP, the relay NC (see FIG. 1A) becomes deenergized in accordance with the opening of its circuit at front contact 74 of relay PNCP. The dropping away of relay NC terminates the transmission of mark frequency energy to field station No. 62 and thus terminates the conditioning period.

During the conditioning period at the field station No. 62, the relay FNP (see FIG. 2A) becomes picked up, and the picking up of this relay causes the picking up of relay E1 (see FIG. 2F) by the energization of a circuit that has been described. The picking up of relay E1 causes the picking up of relay EE1 by the energization of a circuit that has been described when considering the initiation of a control cycle. The picking up of relay FNP at field station No. 62 also initiates the transmission of space frequency energy by the Station 62 Carrier Transmitter F3 (see FIG. 2A). The Station 62 Carrier Transmitter F3 transmits the space frequency in accordance with the connection from the upper left hand terminal of Station 62 Carrier Transmitter F3 to the left hand center terminal by a circuit including wire 53, back contact 54 of relay O1, wire 55, back contact 56 of relay LS, front contact 57 of relay MO, front contact 325 of relay FNP, front contact 326 of relay MO, and back contact 327 of relay ME. This transmission of space energy continues until the dropping away of relay FNP in accordance with the cessation of mark energy transmitted from the control office during the conditioning period.

*Transmission of indications.*—Indications are transmitted from the field in a series of binary pulses, mark or space, one pulse assigned to each two position function in the field to have its position indicated. In the off interval preceding each even on period, relay ME (see FIG. 2A) is selectively picked up or retained in its dropped away position to determine the next character to be transmitted. The relay ME retains its position throughout the following off period and throughout the next odd on period.

Likewise, the relay MO functions in a similar manner to the relay ME in that it is selectively picked up in the off interval preceding each odd on interval and that it retains its position throughout the following even on period. These relays are used to key the carrier transmission from field station No. 62 and to serve as part of a means for checking the integrity of indication transmission. The relays ME and MO, when picked up, cause the transmission of mark frequency, and when dropped away cause the transmission of space frequency.

At the control office, the mark relay M is picked up in any on interval if the relay MO or ME is picked up at the field station No. 62. The position of the relay M determines the character to be transmitted from the control office during the next on period. For example, a space frequency is transmitted if the relay M is picked up, and a mark frequency is transmitted if the relay M is in its dropped away position. At the field station, the relay T is retained in its picked up position only providing space character frequency is received when the relay ME or MO corresponding to the previous even or odd digit is picked up. Similarly, relay T is retained in its picked up position if the field station No. 62 receives mark frequency in an odd digit with the relay ME in its dropped away position, or in an even digit with the relay MO in its dropped away position. In other words, the relay T at field station No. 62 would be retained in its picked up position to permit transmission to continue only if the field station receives a digit of character opposite to that which it transmitted in the preceding on period. The reception of a corresponding character by the field is obviously in error, and such reception results in the release of the relay T to terminate the cycle and thus automatically initiate the transmission of a repeat cycle.

Inasmuch as the mode of operation of the stepping of the system during an indication cycle is comparable to that which has been described as being effective during a control cycle, it will not be necessary to consider this operation in detail when considering the transmission of indications. Thus, it will be assumed that the counting relays VA1 through VH1 are actuated in a sequence of operation during an indication cycle the same as has been described during a control cycle wherein a new counting relay is picked up during each even numbered digit and is dropped away during the alternate odd numbered digit.

With reference to FIG. 2B, odd and even buses are provided for the control of the odd and even transmitting relays MO and ME respectively in accordance with indication codes selected for transmission. The wires 328 and 329 are effective alternately during the odd periods to control relay MO, and the wires 330 and 331 are effective for alternate even digits to control the relay ME. With reference to FIG. 2D, typical relay devices RK, VL and VUL are illustrated as having indications of their conditions transmitted to the control office. The relay RK is in its picked up or dropped away position in accordance with whether an engine at field station No. 62, that can be controlled during a control cycle is running or is shut down respectively. The relay VL is controlled in accordance with the loading of a valve, and the relay VUL is controlled in accordance with the unloading of a control valve. Relay ESD (see FIG. 2F) also selects an indication character that is transmitted during an indication cycle to indicate the status of the emergency shut down equipment at station No. 62.

To consider specifically the mode of operation for the transmission of typical indication codes, it will be assumed that there has been an emergency shut down and the relay ESD has been picked up. The picking up of this relay closes front contact 64 in the control circuit for the relay MO (see FIG. 2A). The circuit by which relay MO is energized under these conditions includes front contact 64 of relay ESD, front contact 332 of relay VB1, wire 333, wire 338, front contact 334 of relay OO1, front contact 335 of relay E1, wire 336, front contact 337 of relay CD, lower winding of relay MO, front contact 338 of relay T and front contact 308 of relay O1. Relay MO is maintained picked up by a stick circuit including front contact 304 of relay CY1, wire 314, back contacts 340 and 341 of relays O1 and E1 connected in multiple, wire 342, front contact 343 of relay MO, upper winding of relay MO and front contact 317 of relay T. The closure of front contacts 57, 59 and 326 of relay MO in the transmitting circuit (see FIG. 2A) provides that the character transmitted during the third digit is a mark character. It will be readily apparent that if the relay ESD is in its dropped away position in accordance with no emergency shut down control having been communicated to field station No. 62, the relay MO cannot be picked up because of the opening of its circuit at front contact 64 of relay ESD (see FIG. 2D) and thus a space character is transmitted during the third digit of the indication cycle.

It will be noted that contact 64 of relay ESD, for example, serves a double purpose of being part of an indication start circuit and it also selects a code character for transmission. It will be noted that when front contact 64 is closed, continuity in the start circuit is maintained through back contact 332 of relay VB1, connected in multiple with a rectifier 332a. When relays ESD and VB1 are both in their picked up positions, continuity in the start circuit is maintained through the rectifier 332a. The rectifier 332a serves the purpose of preventing the application of energy in a run around circuit through back contact 64 to wire 33 when it is intended that a space character be selected in accordance with the dropped away condition of relay ESD.

The indication transmitted during the fourth digit is a mark or a space character in accordance with the condition of the engine run indication relay RK (see FIG. 2D). If the relay RK is in its picked up position because of the engine at station No. 62 being in operation, the relay ME is picked up during the off period preceding the fourth digit in accordance with the energization of a circuit including front contact 61 of relay T (see FIG. 2C), wire 563, back contact 64 of relay ESD, front contact 65 of relay RK, front contact 543 of relay VB1, wire 344, wire 330, back contact 345 of relay EE1, back contact 346 of relay E1, wire 347, upper winding of relay ME, front contact 306 of relay T, wire 307, and back contact 308 of relay O1. Relay ME is maintained picked up by a stick circuit including front contact 304 of relay CY1, wire 314, front contacts 340 and 341 of relays O1 and E1 respectively, wire 348, front contact 349 of relay ME, lower winding of relay ME, and front contact 317 of relay T. This stick circuit is effective to maintain the relay ME picked up through the even digit for which it is controlling the transmission and also for the next following odd digit.

The transmission of a mark as the fourth digit of the indication cycle is dependent upon the reception of a character from the control office opposite in character to the preceding character that has been transmitted. Thus, for example, if a mark character has been transmitted during the third on period of the cycle, the relay MO will be in its picked up position during the fourth on period, and in accordance therewith, the transmitting circuit will require the relay FNP to be picked up in accordance with the reception of a space character from the control office. Under these conditions, a mark character is transmitted in accordance with the connection of the upper left-hand terminal of Station 62 Carrier Transmitter F3 (see FIG. 2A) to the lower left-hand terminal through wire 53, back contact 54 of relay O1, wire 55, back contact 56 of relay LS, front contact 57 of relay MO, front contact 325 of relay FNP, front contact 326 of relay MO, and front contact 327 of relay ME.

If the preceding character transmitted had been a space, the relay FPP would be in its picked up position rather than the relay FNP in accordance with the reception of a mark character during the fourth digit would be in accordance with the closure of a circuit from the upper left-hand terminal of Station 62 Carrier Transmitter F3 through wire 53, back contact 54 of relay O1, wire 55, back contact 56 of relay LS, back contact 57 of relay MO, front contact 58 of relay FPP, back contact 59 of relay MO, and front contact 60 of relay ME.

Having thus described the mode of operation for the transmission of typical indications during an indication cycle, it should be readily apparent that a similar mode of operation is effective for the transmission of indications of the conditions of other devices.

*Delivery of indications.*—The relays M and S (see FIG. 1D) at the control office are actuated in accordance with the reception of mark and space characters respectively from any one of the field stations that is transmitting. If field station No. 62 is transmitting, the mark relay M can be picked up upon reception of a mark character by the energization of a circuit that has been described including back contact 310 of the station relay ST and front contact 311 of the code receiving relay 62CRM. Relay M is maintained picked up during the following off period by the energization of a stick circuit including back contact 322 of relay C, back contact 323 of relay CP, contact 323 of relay CP, lower winding of relay M, back contact 324 of relay S, front contact 85 of relay M, back contact 549 of relay NC, and back contact 350 of relay PC. In accordance with the reception of a space character, the relay S is similarly controlled.

The delivery of an indication is rendered effective during the off period following the on period in which the indication code character is received. Thus, for example, if a mark character is received during a particular on period, the relay M is picked up as has been described, and the delivery of the indication is rendered effective during the following off period.

To consider the delivery of a typical indication, it will be assumed that an indication has been transmitted from field station No. 62 wherein a mark is transmitted during the fourth digit. This causes the picking up of the mark relay M at the control office during the fourth on period. In the following off period, a delivery circuit is closed for picking up relay 62RK1 (see (FIG. 1F). The pick-up circuit for relay 62RK1 includes back contact 351 of relay C (see FIG. 1D), front contact 352 of relay M, back contact 353 of relay NC, back contact 354 of relay PC, wire 355, front contact 356 of relay E, front contact 357 of relay EE, wire 358, back contact 359 of relay LT, wire 360, front contact 361 of relay VC, wire 362, front contact 363 of relay STP, resistor 364, rectifier 365, lower winding of relay 62RK1, and back contact 366 of relay 62H. The picking up of this relay establishes a stick circuit at front contact 367 to maintain relay 62RK1 picked up until it is driven down or until the relay 62H becomes picked up. If it is assumed that the preceding cycle has been a control cycle for starting the engine at station No. 62 as was described when considering the transmission of control codes, the indicator lamp 62SE has been flashed in accordance with flashing energy applied through front contact 368 of relay 62SS and back contact 369 of relay 62RK1 to the start indicator lamp 62SE. The picking up of the indication relay 62RK1 to indicate that the engine has been started opens the circuit that has been described for the indicator lamp 62SE and closes a circuit for the steady energization of lamp 62RE through front contact 370 of relay 62SS and front contact 371 of relay 62RK1.

*Clearout at end of indication cycle.*—After the indication cycle has progressed into the sixteenth on period, conditions are established preliminary to the termination of the cycle in a manner comparable to that which has been described in detail relative to the clearout at the end of the control cycle. The relays E and EE (see FIG. 1B) at the control office are both picked up during this on period, and the relay NC (see FIG. 1A) is dropped away to terminate the last on period in response to the dropping away of relay PNCP. During the last off period, the relays PNC, PNCP, PC and O become picked up in a manner similar to that which has been described when considering the mode of operation of the system upon clearing out at the end of a control cycle. The picking up of relay PC marks the end of the last off period, and causes the dropping away of relay PNC which in turn causes the dropping away of relay S, all in a manner corresponding to that which has been heretofore described. The length of the clear out period is determined by the long drop away time of the relay CY (see FIG. 1D) which becomes deenergized upon the picking up of relay PC.

At field section No. 62, the reception of mark frequency energization from the control office causes the picking up of relay FPP (see FIG. 2A) and the picking up of relay FPP causes the dropping away of relay E1 (see FIG. 2F) in accordance with the opening of the stick circuit for that relay at back contact 204 of relay FPP (see FIG. 2E). The picking up of relay FPP also deenergizes the relay CY1 (see FIG. 2C) by the opening of back contact 666 of relay FPP. Relay CY1 is made slow to drop away so that it is effective to time the clear out period at the end of the indication cycle at field station No. 62.

The change relay CH (see FIG. 2D) which is normally energized and which is dropped away to initiate an indication cycle, has been picked up shortly after initiation of the indication cycle in response to the picking up initially during the cycle of the relay O1. The pick up circuit for relay CH includes front contact 372 of relay MO (see FIG. 2C), front contact 373 of relay CY1, wire 374, front contacts 100 and 103. The cycle distribution relay OO1, back contact 377 of relay VB1, back contact 378 of relay VC1, back contact 379 of relay VD1, back contact 380 of relay VE1, back contact 381 of relay VF1, back contact 382 of relay VG1, back contact 383 of relay VH1, and Change Detector 68.

When the relay CY1 becomes dropped away at field station No. 62 during the clear out period, the dropping away of that relay causes the dropping away of relay CYP (see FIG. 2C) by opening its stick circuit at front contact 224, and it also causes the dropping away of relays O1, EE1, and OO1 by opening their circuits at front contact 100 and 103. The cycle distribution relay CD (see FIG. 2C) is deenergized by the dropping away of the relay T, which in turn has been deenergized by the dropping away of the relay CY1. Relay T has been maintained energized until the dropping away of the relay CY1 by a stick circuit including front contact 385 of relay CY1, front contact 386 of relay FPP, front contact 387 of relay FPP, back contact 388 of relay ME, wire 389, front contact 390 of relay O1, wire 391, lower winding of relay T, and front contact 392 of relay T. Relay T is made slow to drop away by the shunting of its lower winding with the resistor 393. Upon the dropping away of relay T, the cycle distribution relay CD becomes deenergized by the opening of a stick circuit for that relay including front contact 394 of relay CD, front contact 395 of relay T, upper winding of relay CD, and capacitor 396. This relay is initially energized at the beginning of the cycle through front contact 397 of relay CY1. Relay CD is made very slow to drop away so as to permit the initiation of an indication cycle by another field station, if another field station has an indication stored start at the time of termination of the cycle transmitted by field station No. 62. Relay CD is made slow to drop away for this purpose by the shunting of its lower winding through capacitor 396 and back contact 398 of relay LS.

At the control office, the relay CY, which corresponds to relay CY1 at the field station, is made slower to drop away than the relay CY1 at the field station so that the field station has sufficient time to be cleared out before the termination of the clearout period by the control office. After the relay CY at the control office has had time to be dropped away, the relays E, O, EE, VH, and SPP become dropped and the relay ST becomes picked up in response to the dropping away of relay SPP, all in a manner corresponding to that which has been heretofore considered in detail relative to the mode of operation in clearing out the system at the end of the control cycle.

*Integrity checking.*—Relay T (see FIG. 2C) checks the integrity of transmission of indications from field station No. 62 to the control office. The relay T can be picked up only in a period of rest upon the starting of an indication cycle by the energization of a circuit that has been described. Once in its picked up position, the relay T checks the integrity of transmission by means of its stick circuit. As has been heretofore pointed out, the control office must transmit energy opposite in character in response to each pulse transmitted by a field station during an indication cycle, and such character must be received at the field station in order for transmission from the field station to continue. Thus, the relay T is retained energized by its stick circuit if the field station receives space character frequency when its ME or MO relay, corresponding to the previous even or odd digit, is picked up. The relay T also checks that mark frequency energy is received at the field station in an odd digit when the relay ME is in its dropped away position. Thus the relay T is maintained energized by its stick circuit only provided that the field station receives a digit opposite in character to that which it transmitted in the preceding on period. The reception of the same code character at the field station as was transmitted during preceding on period is obviously an error, and thus such reception results in the instant release of the relay T. The dropping away of the relay T under such conditions causes the relay CH to be dropped away for initiation of another indication cycle. The field station will repeat its transmission of indication until the integrity check as determined by the stick circuits for relay T is properly fulfilled.

To consider the stick circuits for relay T more specifically, this relay is maintained picked up during each of the off periods of a cycle in accordance with the relays FPP and FNP being both in their dropped away position. The stick circuit that is closed for relay T at this time includes front contact 385 of relay CY1, back contact 386 of relay FPP, back contact 399 of relay FNP, wire 400, back contact 402 of relay X, lower winding of relay T and front contact 392 of relay T.

During the conditioning period, or zero digit, at the start of an indication cycle, the control office transmits space frequency unless a control cycle is to take preference in case of a simultaneous control office and indication start. Thus the relay FNP is picked up during this period, and the relay FPP is in its dropped away position. This establishes stick circuit energy for the relay T through front contact 385 of relay CY1, back contact 386 of relay FPP, front contact 399 of relay FNP, back contact 387 of relay FPP, front contact 403 of relay FNP, front contact 404 of relay MO, wire 405, back contact 390 of relay O1, wire 391, lower winding of relay T, and front contact 392 of relay T.

The relays ME and MO, which are used for selection of characters for transmission at the field station, are maintained energized during the following on period for the purpose of checking to determine that the character received from the office is opposite to the character transmitted during a preceding on period. Thus, the stick circuit for the relay T is so energized that during each odd digit, with relay O1 in its picked up position, a space character must be received to picked up relay FNP if the relay ME is picked up in accordance with the transmission of a mark character during the preceding on period. Such stick circuit includes front contact 385 of relay CY1, back contact 386 of relay FPP, front contact 399 of relay FNP, back contact 387 of relay FPP, front contact 403 of relay FNP, front contact 388 of relay ME, wire 389, front contact 390 of relay O1, wire 391, lower winding of relay T, and front contact 392 of relay T. If a space character has been transmitted from the field station during the preceding on period, the relay ME is in its dropped away position, and this requires the reception from the control office of a mark character for picking up relay FPP in order to maintain the relay T energized through front contact 385 of relay CY1, front contact 386 of relay FPP, front contact 387 of relay FPP, back contact 388 of relay ME, wire 389, front contact 390 of relay O1, wire 391, lower winding of relay T and front contact 392 of relay T.

Similarly, in an even digit, when the relay O1 is in its dropped away position, the reception of a space character from the control office requires that the relay MO be in its picked up position in order that stick energy may be provided for the relay T through fron contact 385 of relay T, back contact 386 of relay FPP, front contact 399 of relay FNP, back contact 387 of relay FPP, front contact 403 of relay FNP, front contact 404 of relay MO, wire 405, back contact 390 of relay O1, wire 391, lower winding of relay T, and front contact 392 of relay T. If the preceding character transmitted from the field station has been a space character, the relay MO is in its dropped away position and thus a mark character must be received from the office in order to maintain a stick circuit closed for relay T including fron contact 385 of relay CY1, front contact 386 of relay FPP, front contact 387 of relay FPP, back contact 404 of relay MO, wire 405, back contact 390 of relay O1, wire 391, lower winding of relay T and front contact 392 of relay T.

If the relay T is dropped away prematurely in the cycle because of detecting an error in the transmission, the opening of its front contact 395 in the circuit for the cycle distribution relay CD at an early point in the cycle provides that the relay CD will become dropped away before the end of the cycle so that its function of cycle distribution will be ineffective, and another cycle will be immediately transmitted from field station No. 62.

The check of integrity of the communicaiton system at the control office is accomplished by the relays CYK and XT (see FIGS. 1D and 1E respectively). One of the requisites for continued transmission during a control cycle is that before the system proceeds from an odd to an even digit, the control office must receive a mark character from the field station. In order to proceed from an even digit to an odd digit, either one of two conditions must be met. If there is no command to execute a control, relay PX or NX (see FIG. 1D) will be in its picked up position at the control office and the relay X must be in its dropped away position at the field station. Under these conditions, the field station transmits a space character. If a command to execute a control has been set up, the relays PX and NX at the Control Office are both in their dropped away positions and relay X at the field station must be in its picked up position. Under these conditions, the office expects to receive a mark character from the filed, and if such character is received, the cycle will progress to the next on digit after an abnormally long execution period which is timed by the drop away time of the relay XT (see FIG. 1E). The drop away time of relay XT is made long by the shunting of its winding by the resistor 406 connected in series with the capacitor 407. This relatively long time interval for the delivery of a control transmitted from the control office is provided because of the time required to actuate the engine control solenoids at the field stations. If, according to the requirements of practice, the devices at the field stations to be controlled from the control office do not require extra time for control delivery, it will be unnecessary to provide the extra time interval for execution as is provided in this embodiment of the present invention by the slow drop away control provided for the relay XT.

During the control cycle, the make-up circuits for the control code are opened in each on period when the relay E changes its position. The relay PC or NC that is in its picked up position at this time is held by a stick circuit through front contact 29 of relay PNCP (see FIG. 1B), until this relay becomes dropped away for termination of the on period. Connected in multiple with front contact 29 of relay PNCP is back contact 408 of relay XT. This contact provides that the system cannot go into an off period unless the relay XT is in its picked up position. In other words, back contact 408 of relay XT holds the relay PC or NC energized beyond the end of the normal on period in case the relay XT has been dropped away because of the detection of an error in the communication system.

This causes the relay CY (see FIG. 1D) to be dropped away, because the relay CY is energized only during the off periods. Also the relay CYK becomes dropped away because its circuit is opened at front contact 42 of relay XT (see FIG. 1E). The relay CYK cannot again be picked up until the reset push button 409 is actuated to close a circuit including back contact 410 of relay CY. Relay CYK is made slow to drop away by the shunting of its winding through resistor 411 and capacitor 412 connected in series. The dropping away of the relay CYK indicates to an operator that there has been an error by the deenergization of the lamp CE upon the opening of its circuit at front contact 413, and by the sounding of an alarm (not shown). The dropping away of relay CYK opens the circuit for relay CY, and the dropping away of relay CY causes the dropping away of relays C and CP (see FIG. 1A). A circuit is now established to cause the picking up of relay PC to restore the system to a condition of rest. This circuit includes back contact 69 of relay C, back contact 70 of relay NC, upper winding of relay PC, back contact 72 of relay CYK, wire 73, front contact 74 of relay PNCP, wire 75, back contact 76 of relay CP, and contacts 77 and 78 of hand step switch HS. During steps where there is no control execution, a relay PX or NX is in its picked up position, and a failure to energize a relay M or S in response to the pulse received from the field station so as to permit the picking up of a relay PC or NC, will cause the dropping away of the relay CYK. Even though relay XT may be in its picked up position.

*Recheck of indications.*—A recheck relay RC (see FIG. 3) is provided at the control office for each of the field stations corresponding to the recheck relay 62RC that is provided for the initiation of a recheck cycle for the retransmission of indications from field station No. 62. Relay 62RC can be picked up when the system is in a condition of rest by the energization of a circuit including back contact 48 of relay CY, contact 414 of push button 62RPB and lower winding of relay 62RC. A stick circuit is closed to maintain this relay energized including front contact 415 of relay CY, back contact 416 of relay 62ESDP, front contact 417 of relay 62RC and upper winding of relay 62RC. The picking up of relay 62RC is effective to apply energy to the relay C (see FIG. 1A) for initiation of a cycle in accordance with the closure of its front contact 418.

With reference to FIG. 1C, the relays 62RC and 63RC are effective to control the stepping during a cycle so as to terminate a cycle calling for a recheck during the fourth digit. This is accomplished by the establishment of a stick circuit for the relay O (see FIG. 1B), including front contact 87 of relay CY (see FIG. 1A), wire 124, front contact 419 of relay VB, wire 420, a front contact 421 of relay 62RC or a front contact 422 of relay 63RC, wire 423, front contact 424 of relay EE, front contact 425 of relay O, wire 426, back contact 427 of relay NC, wire 126, and upper winding of relay O.

The maintaining of the relay O energized causes the system to clear out in a manner corresponding to that which has been described when considering the mode of operation of the system during a clear out period at the end of a complete control cycle. It will be noted that the relay O is similarly held for a normal cycle by the energization of a stick circuit for relay O during the seventeenth off period. Such stick circuit includes front contact 87 of relay CY (see FIG. 1A) wire 124, back contact 419 of relay VB, back contact 428 of relay VC, back contact 429 of VD, back contact 430 of relay VE, back contact 431 of relay VF, back contact 432 of relay VG, front contact 433 of relay VH, front contact 424 of relay EE, front contact 425 of relay O, wire 426, back contact 427 of relay NC, wire 126, and upper winding of relay O.

At the field station, the relay LSP (see FIG. 2C) provides a means for automatically creating a field start anytime an incomplete control cycle occurs, such as is the case for a control cycle calling for a recheck of indications as has been heretofore considered. The relay LSP picks up during the third digit of a control cycle for station 62 by the energization of a circuit including front contact 218 of relay CY1, wire 219, front contact 434 of relay VB1, back contact 435 of relay OO1, back contact 436 of relay EE1, wire 437, upper winding of relay LSP, front contact 438 of relay LSP, front contact 438 of relay LS, and front contact 439 of relay CYP. This relay is normally maintained energized throughout a control cycle by a stick circuit including front contact 218 of relay CY1, wire 219, back contact 220 of relay VH1, wire 440, lower winding of relay LSP, and front contact 441 of relay LSP. After the relay VH1 becomes picked up in the fourteenth digit, a new stick circuit is provided for the relay LSP to maintain that relay energized until the sixteenth digit. This stick circuit includes front contact 218 of relay CY1, wire 219, back contact 434 of relay VB1, front contact 442 of relay VH1, back contact 443 of relay VG1, back contact 444 of relay VF1, back contact 445 of relay VE1, back contact 446 of relay VD1, back contact 447 of relay VC1, back contact 221 of relay EE1, wire 440, lower winding of relay LSP and front contact 441 of relay LSP.

When a short control cycle is created, for example, to call of a recheck of indications, the dropping away of the relay CY with the relay LSP maintained in its picked up position momentarily opens the change circuit for the energization of relay CH at 448 of relay VY1, back contact 61 of relay T being closed at this time, and back contact 62 of relay LSP being opened. The dropping away of relay CH due to the momentary interruption of its holding circuit initiates a cycle of operation for the recheck of indications by a mode of operation corresponding to that which has been described for the normal initiation of an indication cycle.

*Indication storage unit.*—Solid state storage units are used in the office to control the energization of all indicator lamps except the run and stop indicator lamps which have had their circuits already described. Thus, for example, with reference to FIG. 1F, the Storage Unit 449 is provided for the control of the indicator lamp 62VK to indicate the condition of a valve at field station No. 62. Input energy of a selected polarity is applied to the storage unit 449 during the off period following the fifth digit of an indication cycle through wire 450, (see FIG. 1E), front contact 451 of relay STP, and wire 452.

Figure 6:
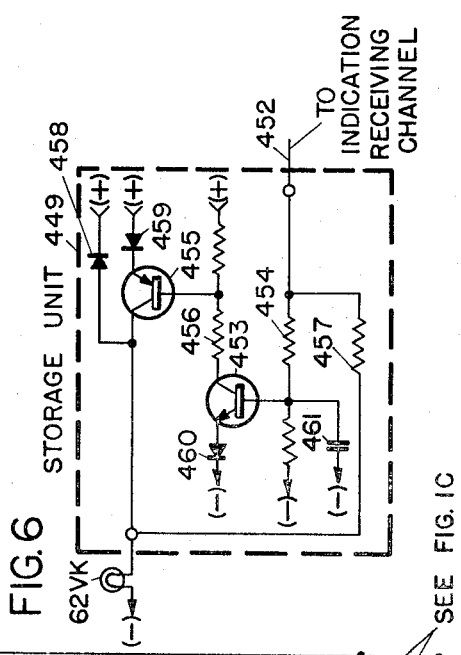
FIG. 6 illustrates a typical storage unit provided at the control office for the reception and storing of the respective indications communicated from the field stations.

With reference to FIG. 6, the application of positive battery momentarily to the input wire 452 of the Storage Unit 449, for example, causes the NPN transistor 453 to conduct in accordance with the application of energy to its base through resistor 454. The output of the transistor 453 is applied to the base of the PNP transistor 455 through resistor 456 so as to make the base of the transistor 455 negative with respect to its emitter. This causes energization of the lamp 62VK in the output circuit of the transistor 455. The voltage drop across the lamp 62VK acts through the resistor 457 to hold the base of transistor 453 positive, maintaining conduction after the initial input pulse to the storage unit 449 has been terminated. A diode 458 is connected between the collector of transistor 455 and the positive terminal of the battery to protect the transistor 455 against high voltage transients in the lamp circuit. Diodes 459 and 460 are connected in series with the emitters of transistors 455 and 453 respectively as bias diodes, off setting the tendency for self induction due to the small base-collector leakage current present when a transistor is hot. A capacitor 461 is connected to the base of transistor 453 for the purpose of preventing unwanted operation initiated by noise spikes that might appear in the input circuit.

Upon the application of a negative energy pulse to the input terminal of the Storage Unit 449 in accordance with the reception of a space indication character, the lamp 62VK is extinguished because the negative input reduces the forward bias of transistor 453 below the conduction point, effectively turning off transistor 453. This terminates output through the transistor 455 to the lamp 62VK, and in accordance with the extinguishing of the lamp, the forward bias on the transistor 453 is now removed, and the transistor will remain in its nonconductive state until a positive input pulse is received.

*Indication start change detector.*—It has been heretofore pointed out that the relay CH (see FIG. 2D) at the field station No. 62 is a normally energized relay which is dropped away to initiate an indication cycle whenever a change in the condition of a device to have its position indicated is registered. Such registration is accomplished by the shifting of the position of the device, which is effective, by the momentary interruption of the circuit for relay CH, to cause that relay to be dropped away.

Figure 5:
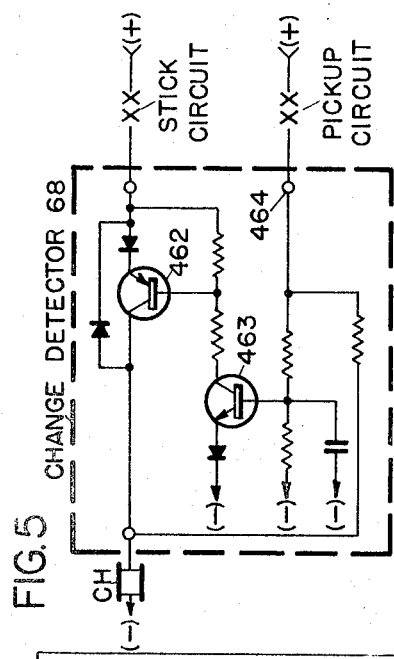
FIG. 5 illustrates a typical change detector unit used at each of the field stations for detecting when a change occurs for the initiation of the transmission of indication codes from the associated field station.

This circuit includes a solid state Change Detector 68, which has a circuit organization as is shown in FIG. 5. It will be recognized that this circuit organization corresponds to the circuit organization of the solid state Storage Unit 449 that has just been described, except that the output terminal of the Change Detector 68 is connected to a relay CH instead of being connected to an indicator lamp as in the storage unit. It is also provided in the Change Detector 68 that sustained energization of the relay CH through a transistor 462 is dependent upon the change circuit that has been described including front-back contact combinations of the respective devices to have their positions indicated, rather than being maintained until a negative pulse is applied, as is the case of the Storage Unit. Thus, the relay CH becomes dropped away due to momentary interruption of its circuit through the transistor 462 and this deenergization removes the forward bias on the transistor 463 to cause that transistor to become nonconductive, and to thereby prevent the picking up of the relay CH again until a positive pulse is applied to the terminal 464 to render the picking up of the relay effective. The terminal 464 corresponds to the input terminal to which the wire 452 is connected of the Storage Unit 449, and thus the momentary energization of this terminal with positive energy during an indication cycle causes the transistors 463 and 462 to be rendered conductive, and thus to cause the picking up of the relay CH. The energization of relay CH establishes a forward bias for the transistor 463 by the voltage drop across the winding of the relay CH.

Having described one embodiment of a coded supervisory control system, it is to be understood that this form is selected to facilitate in the disclosure of the invention rather than to limit the number of forms which the invention may assume, and it is to be understood that various adaptations, alterations and modifications may be applied to the specific forms shown to meet the requirements of practice within the scope of the appending claims.

What I claim is:

1. A normally at rest code communication system for code communication between two stations comprising:
   (a) code transmitting means at each of the stations for transmitting a plurality of selected binary time spaced code characters as respective digits of a multiple digit cycle over a communication channel to the other station,
   (b) said code transmitting means having at one station odd and even code character selecting relays for selecting the code characters transmitted during respective odd and even digits,
   (c) means for selectively energizing said odd character selecting relay during an odd numbered digit and for selectively energizing said even character selecting relay during an even numbered digit,
   (d) stick circuit means for maintaining said odd character selecting relay energized during the next following even digit if it has been picked up during an odd digit,
   (e) stick circuit means for maintaining said even character selecting relay energized during the next following odd digit if it has been picked up during an even digit,
   (f) means at the other station for transmitting a code character in each digit opposite in character to the character received at that station during the preceding digit, and
   (g) checking means at said one station including contacts of said code character selecting relays for distinctively registering whenever a code character is received from the other station that is not opposite in character relative to the character that was transmitted from said one station during the next preceding digit.

2. A code communication system according to claim 1 wherein a mark or spaced code character is selected for transmission during an odd or even digit depending upon whether said odd relay is in its picked up position during an odd digit or whether said even relay is in its picked up position during an even digit.

3. A code communication system according to claim 1 wherein said checking means causes the transmission of an incomplete cycle in case a character is received from said other station that is not opposite in character to the character transmitted during the next preceding digit.

4. A code communication system according to claim 1 wherein said checking means causes retransmission of codes from said one station in case a character is received from said other station that is not opposite in character to the character transmitted during the next preceding digit.

5. A code communication system according to claim 1 wherein said checking means includes a relay at said one station that is normally maintained picked up during transmission from said one station and is dropped away to register an error when a character is received from said other station that is not opposite in character to the character transmitted during the next preceding digit.

6. A normally at rest code communication system including a communication channel connecting a control office and at least one field station comprising:
   (a) control office code transmitting means for transmitting a plurality of selected time spaced code characters over the communication channel to a selected station as respective digits of a multiple digit control cycle,
   (b) said control office code transmitting means comprising means for selecting for transmission control and execution code characters as alternate digits of the control cycle,
   (c) field station code transmitting means at each of the field stations operable during a control cycle if that field station is called for normally transmitting over the communication channel pulses that alternate in character and are in synchronism with the rate of transmission of pulses by said control office code transmitting means,
   (d) said control office code transmitting means comprising means for selecting transmission a code character following a control code digit of a different character than the character of the preceding control code digit if the control is to be executed and of the same character if there is to be no execution of the control code,
   (e) said field station transmitting means comprising means for changing the character of transmission in response to the transmission by the office of said different character as an execution code, and
   (f) means at the office controlled by pulses transmitted by said field station transmitting means during a control cycle for registering a failure of an execution code to render the execution of a control effective during the cycle.

7. A code communication system according to claim 6 wherein the control office transmitting means provides an abnormally long period of deenergization of the communication channel following the transmission of an execution character provided that the execution character is different than the code character transmitted as the next prior code digit.

8. A normally at rest code communication system for communicating indication codes from a remote field station to a control office during an indication cycle indicative of the positions of a plurality of two position devices comprising:
   (a) cycle initiating means including front and back contacts in multiple of each of the devices connected in a normally energized circuit for initiating a cycle of operation of the code communication system for the communication of indication codes from the field station to the office when there is a change in the position of any one of said devices,
   (b) step counting means at the field station having several stepping relays operated sequentially during an indication cycle for counting code pulses that are transmitted,
   (c) indication code selecting means including one of said contacts of one of said devices that is included in said normally energized circuit and a front contact of one of said step counting relays in series for selecting a binary code for transmission during a particular step of an indication cycle in accordance with the condition of said one device,
   (d) said cycle initiating means having a unidirectional device connected in series with one of contacts of each of said devices, and
   (e) said cycle initiating means having back contacts of said stepping relays connected in said normally energized circuit for shunting said unidirectional devices respectively.

9. A normally at rest code communication system according to claim 8 wherein said indication selecting means selects the codes transmitted during two time spaced digits for each step counted.

10. A code communication system according to claim 8 wherein said cycle initiating means includes a normally energized change relay controlled by a solid state change detector for detecting a momentary interruption in the continuity of a circuit including said contacts of said devices.

11. A code communication system for two-way code communication between at least two stations over a communication channel comprising;
(a) code transmitting and receiving means at each of the stations for the communication in both directions over the communication channel of different series of pulses of selected characters during successive digits,
(b) storage means at one of the stations effective while transmitting a series of pulses from that station for storing during each of several successive digits the identity of the character transmitted by said one station during the next prior digit,
(c) said transmitting means at the other station being operable to transmit during said each of several digits of transmission from said one station the complement of the character received over said communication channel during the next prior digit, and
(d) checking means selectively actuated at said one station in accordance with whether a code character received over the communication channel during said each of several digits is the complement of the character transmitted by said one station during the next preceding digit.

12. The invention according to claim 11 wherein means is provided responsive to said checking means for initiating retransmission of a series of pulses by said transmitting means at said one station if a pulse is received at said one station during said one digit other than the complement of the pulse transmitted by said one station during the next preceding digit.

13. A code communication system for two-way code communication over a communication channel between two stations comprising;
(a) code transmitting and receiving means at each of the stations for two-way communication of a plurality of selected binary code characters successively as respective digits of a multiple digit cycle,
(b) said code transmitting means at one of the stations having odd and even binary devices for selecting the code character transmitted by that station during respective odd and even digits,
(c) means for selectively actuating said odd binary device to a particular one of its binary conditions during an odd digit and for maintaining said odd binary device in that condition during the next even digit,
(d) means for selectively actuating said even binary device to a particular one of its binary conditions during an even digit and for maintaining said even binary device in that condition during the next odd digit,
(e) means at the other of said stations for transmitting a code character in each digit that is the complement of the code character received over the communication channel during the next preceding digit, and
(f) checking means at said one station governed jointly by said odd and even binary devices and by code characters received over the communication channel for distinctively registering when a character received from the other station is of some character other than the complement of the character transmitted by said one station during the next preecding digit.

14. The invention according to claim 13 wherein means is provided for automatically starting a second cycle at said one station in response to the detection by said checking means that a character is received at said one station that is other than the complement of the next preceding character transmitted by said one station.

15. The invention according to claim 13 wherein said odd and even binary devices are relays.

References Cited by the Examiner
UNITED STATES PATENTS

| | | |
|---|---|---|
| 2,626,382 | 1/1953 | Coley. |
| 2,685,681 | 8/1954 | Tidball _____ 340—147 |
| 2,906,996 | 9/1959 | Bachelet et al. _____ 340—147 |
| 3,107,340 | 10/1963 | Silliman et al. _____ 340—163 |
| 3,122,723 | 2/1964 | Coley et al. _____ 340—163 |

NEIL C. READ, *Primary Examiner.*

P. XIARHOS, D. YUSKO, *Assistant Examiners.*